United States Patent
Fuke et al.

[11] Patent Number: 5,976,713
[45] Date of Patent: Nov. 2, 1999

[54] EXCHANGE-COUPLING FILM AND, MAGNETO-RESISTANCE EFFECT ELEMENT AND MAGNETIC HEAD USING THEREOF

[75] Inventors: Hiromi Fuke, Kawasaki; Kazuhiro Saito; Shin-ichi Nakamura, both of Yokohama; Hitoshi Iwasaki, Yokosuka; Masashi Sahashi, Yokohama, all of Japan

[73] Assignee: Kabushiki Kaisha Toshiba, Japan

[21] Appl. No.: 09/053,651

[22] Filed: Apr. 2, 1998

[30] Foreign Application Priority Data

Apr. 3, 1997 [JP] Japan .................................. 9-085220

[51] Int. Cl.$^6$ ...................................... G11B 5/66
[52] U.S. Cl. ................ 428/692; 428/694 R; 428/694 T; 428/694 TS; 428/694 TM; 428/900; 360/113; 324/252
[58] Field of Search ................ 428/692, 694 R, 428/694 T, 694 TS, 694 TM, 900; 360/113; 324/252

[56] References Cited

U.S. PATENT DOCUMENTS

| | | | |
|---|---|---|---|
| 4,103,315 | 7/1978 | Hempstead | 360/110 |
| 5,014,147 | 5/1991 | Parkin et al. | 360/113 |
| 5,315,468 | 5/1994 | Lin | 360/113 |
| 5,549,978 | 8/1996 | Iwasako | 428/692 |

FOREIGN PATENT DOCUMENTS

| | | |
|---|---|---|
| 8-287420 | 11/1996 | Japan . |
| 9-69209 | 3/1997 | Japan . |
| 2672802 | 7/1997 | Japan . |

*Primary Examiner*—Leszek Kiliman
*Attorney, Agent, or Firm*—Finnegan, Henderson, Farabow, Garrett & Dunner, L.L.P.

[57] ABSTRACT

An exchange-coupling film has an antiferromagnetic film consisting of an antiferromagnetic alloy such as an RMn alloy or an RMnFe alloy (R is at least one kind of element selected from Ir, Rh, Pt, Au, Ag, Co, Pd, Ni, Cr, Ge, Ru and Cu) and a ferromagnetic film stacked with the antiferromagnetic film. The antiferromagnetic film is oriented in its plane. Further, the antiferromagnetic film has a large grain diameter of such as 5 nm or more. The antiferromagnetic film can be obtained by forming a film with an alloy target of which oxygen content is 1% by weight or less. An exchange-coupling film using such an antiferromagnetic film has exchange-coupling force enough large at room temperature and high temperature region together with excellent corrosion resistance or heat resistance. The exchange-coupling film is provided with an electrode for energizing an electric current to the ferromagnetic film and is used as, for example, a spin valve type magneto-resistance effect element.

21 Claims, 15 Drawing Sheets

⟨111⟩ INCIDENCE

⟨$\bar{2}11$⟩ INCIDENCE

EXCHANGE-COUPLING FILM AND, MAGNETO-RESISTANCE EFFECT ELEMENT AND MAGNETIC HEAD USING THEREOF

BACKGROUND OF THE INVENTION

1. Field of the Invention

The present invention relates to an exchange-coupling film between an antiferromagnetic film and a ferromagnetic film and, a magneto-resistance effect element and a magnetic head using thereof.

2. Description of the Related Art

As a reproducing head in high density magnetic recording, study of a magnetic head (MR head) using a magneto-resistance effect film (MR film) is being proceeded. As an MR film, for example, a $Ni_{80}Fe_{20}$ (at %) alloy (permalloy) and the like which shows anisotropic magneto-resistance effect (AMR) is well known. Since a change rate of magneto-resistance effect (MR change rate) of an AMR film is such small as about 3%, as an alternative MR film material, an artificial lattice film or a spin valve film such as $(Co/Cu)_n$ which shows a giant magneto-resistance effect (GMR) is attracting an attention.

Since an AMR film consisting of such as a permalloy film or the like has a magnetic domain, it is important to eliminate Barkhausen noise due to that. Thus, various methods to transform an AMR film into a mono-magnetic domain is being investigated. As one of them, a method to control the magnetic domain of the AMR film into a particular direction by taking advantage of exchange-coupling between an AMR film, being a ferromagnetic material, and an antiferromagnetic film, is in use. As an antiferromagnetic material here, a γ-FeMn alloy is traditionally well known (see, for example, specification of U.S. Pat. No. 4,103,315 and U.S. Pat. No. 5,014,147).

The above described spin valve film has a sandwich film consisting of a laminate structure of a ferromagnetic material layer/a non-magnetic material layer/a ferromagnetic material layer, and the GMR is obtained by pinning down magnetization of one ferromagnetic material layer. In pinning down of magnetization of one ferromagnetic layer material layer of such a spin valve film, a technology taking advantage of exchange-coupling between an antiferromagnetic film and a ferromagnetic film is prevailing. Also in this case, a γ-FeMn alloy is dominantly used as an antiferromagnetic film.

However, there is a problem that a γ-FeMn alloy is poor in its corrosion resistance and, in particular, is prone to be corroded by water. Therefore, when the γ-FeMn alloy is employed, due to corrosion during processing steps of an MR element or a magnetic head or due to corrosion by moisture in the air, an exchange-coupling force with the MR element deteriorates with the lapse of time.

Besides, since a recent MPU in which its throughput is sped up generates heat in quantity, due to that even in a magnetic recording device such as an HDD, the temperature rises up to around 393 K. during operation. Therefore, the exchange-coupling film between an antiferromagnetic film and a ferromagnetic film, from the view point of reliability, is required to have an exchange-coupling force of 200 Oe or more at 393 K. In order to attain an exchange-coupling force of 200 Oe or more at 393 K., it is necessary not only to have high exchange-coupling force naturally at room temperature but also to be excellent in its temperature characteristics of the exchange-coupling force.

Concerning the temperature characteristic of an exchange-coupling force, the blocking temperature where an exchange-coupling force between a ferromagnetic film and an antiferromagnetic film is lost is desirable to be as high as possible. However, the blocking temperature of a γ-FeMn alloy is 443 K. or less and its exchange-coupling force shows very bad temperature characteristic. Therefore, under the temperature environment described above, enough exchange-coupling force can not be obtained.

Thus, there are problems that an MR element or a magnetic head in which a γ-FeMn alloy is employed as an antiferromagnetic film is likely to deteriorate in its characteristics during manufacturing process and, further, under the above described environment of operation temperature, enough long term reliability can not be obtained. To circumvent these problems, for example, in the specification of U.S. Pat. No. 5,315,468, a θ-Mn alloy such as a NiMn alloy which has a crystal structure of a face-centered tetragonal crystal system is disclosed to be used as an antiferromagnetic film.

In the above described gazette, it is disclosed that, when an antiferromagnetic film consisting of a θ-Mn alloy is employed, even in the higher temperature region, an exchange-coupling force between a ferromagnetic film and an antiferromagnetic film does not decrease. In addition, the present inventors have previously proposed an IrMn alloy having a crystal structure of a face-centered cubic crystal system as an antiferromagnetic film which has a high blocking temperature and a large exchange-coupling force, and is excellent in its corrosion resistance (Japanese Patent No. 2672802). As an antiferromagnetic film of the identical crystal structure, a γ-Mn alloy such as a PtMn alloy or a RhMn alloy is known( see, specification of U.S. Pat. No. 5,315,468).

However, an operation environment of an MR element or a magnetic head, in which an exchange-coupling film between an antiferromagnetic film and a ferromagnetic film is used, is becoming more and more severe. For example, an environment temperature during operation tends to rise. In addition, accompanying high densification of recording density, narrowing tendency of a track and a gap is proceeding. Under these circumstances, it is required for the magnetization of, for example, one ferromagnetic material layer to be firmly pinned down. From these reasons, even an antiferromagnetic film consisting of such as an IrMn alloy, a PtMn alloy, a RhMn alloy can not necessarily be said that enough exchange-coupling force is obtained. Thus, there is a demand of an exchange-coupling film, which shows a large exchange-coupling force at room temperature and higher temperature region, between an antiferromagnetic film and a ferromagnetic film.

Further, although a sputtering method is generally employed to form an antiferromagnetic film, all the above described antiferromagnetic materials are consisting of Mn alloys difficult in manufacturing of a high density target. Therefore, there is a problem that control of film quality or purity of the antiferromagnetic film is difficult. Since a crystal structure of a face-centered cubic crystal system is formed in Mn-rich region, it is particularly difficult to produce a target of excellent quality. Deterioration of the film quality or the purity of the antiferromagnetic film can be cause to lower the exchange-coupling force of the ferromagnetic film. In addition, in an MR element or a magnetic head in which such an exchange-coupling film is employed, the antiferromagnetic film is likely to be badly affected from the other layer constituting them to be prone to be deteriorated in its exchange-coupling characteristics.

SUMMARY OF THE INVENTION

Therefore, an objective of the present invention is, through improvement of performance of an antiferromagnetic film consisting of a Mn alloy excellent in its corrosion resistance or temperature characteristics, to provide an exchange-coupling film, in which a large exchange-coupling force can be obtained at room temperature and higher temperature region, between an antiferromagnetic film and a ferromagnetic film. The present invention aims further to provide, through accomplishment of stability of the film quality or the purity of the antiferromagnetic film, an exchange-coupling film which shows enough exchange-coupling force at room temperature and higher temperature region and of which deterioration during processing is suppressed. Another objective of the present invention is, through employment of the above described exchange-coupling film, to provide an magneto-resistance effect element and a magnetic head which enables to obtain stable characteristics or output for a long term.

In order to accomplish the above described objectives, the present inventors, as the result of investigation of the performance of the antiferromagnetic film consisting of various kinds of Mn alloys, found that, by orienting the antiferromagnetic film in its plane, the exchange-coupling force with the ferromagnetic film can be improved. Further, an antiferromagnetic film consisting of a Mn alloy formed in film by, for example, a sputtering method, by orienting in its plane together with by increasing its grain diameter, can be further improved in its exchange-coupling force with the ferromagnetic film. In addition, it is found that, even when a thick film is stacked on an exchange-coupling film, performance deterioration due to increase of internal stress is not induced.

The present invention is accomplished based on such a knowledge. An exchange-coupling film of the present invention comprises a ferromagnetic film and an antiferromagnetic film which contains R—Mn (R is at least one kind of element selected from Ir, Rh, Pt, Au, Ag, Co, Pd, Ni, Cr, Ge, Ru, Re and Cu) and is exchange-coupled with the ferromagnetic film, wherein the antiferromagnetic film is oriented in its plane.

In an exchange-coupling film of the present invention, an antiferromagnetic film oriented in its plane, when an electron beam diffraction is executed on, for example, a film surface, has a fabric domain in which a distribution of each electron beam diffraction pattern can be accommodated within ±15°. As a more preferred shape of an exchange-coupling film of the present invention, an antiferromagnetic film having an average grain diameter of 5 nm or more can be cited.

A magneto-resistance effect element of the present invention comprises the above described exchange-coupling film of the present invention and an electrode to energize an electric current to the ferromagnetic film in the exchange-coupling film. As a more concrete structure of a magneto-resistance effect element, such a structure in which, for example, a ferromagnetic film has a first ferromagnetic material layer pinned in its magnetization by the antiferromagnetic film, further comprising a second ferromagnetic material layer stacked with the first ferromagnetic material layer through a non-magnetic material layer.

A magnetic head of the present invention comprises a lower magnetic shield, the above described magneto-resistance effect element of the present invention formed on the lower magnetic shield through a lower reproducing magnetic gap, and an upper magnetic shield formed on the magneto-resistance effect element through an upper reproducing magnetic gap.

A magnetic head of the present invention further comprises a lower magnetic pole commonly used with the upper magnetic shield, a recording magnetic gap formed on the lower magnetic pole, and an upper magnetic pole disposed on the recording magnetic gap.

An exchange-coupling film of the present invention employs an antiferromagnetic film oriented in its plane.

Since a film oriented within its plane is aligned in its magnetic moment direction and is excellent in its conformity at the interface, when exchange-coupled with a ferromagnetic film, much bigger exchange-coupling force can be obtained. Further, by making the particle size of grain of an antiferromagnetic film 5 nm or more, the grain can be stabilized. Therefore, performance intrinsically possessed by an antiferromagnetic film including R element and Mn can be fully exhibited. In addition, strain within a film of the antiferromagnetic film can be alleviated. To make larger the grain diameter of an antiferromagnetic film contributes to improvement of the blocking temperature.

With these, according to an exchange-coupling film of the present invention, an exchange-coupling force enough large at room temperature and high temperature region can be obtained with stability. Further, even when a thick film is formed on the upper portion of an exchange-coupling film, since increase of internal stress within the exchange-coupling film can be suppressed, performance improvement of a magneto-resistance effect element, a magnetic head, a magnetic memory device and the like in which the exchange-coupling film is employed can be made possible. In a spin valve film where a ferromagnetic film is consisting of a laminate structure of ferromagnetic material layer/non-magnetic material layer/ferromagnetic material layer, in either case where an upper side ferromagnetic material layer thereof and an antiferromagnetic film is exchange-coupled and where a lower side ferromagnetic material layer thereof and an antiferromagnetic film is exchange-coupled, in any case, enough large exchange-coupling force can be obtained. A ferromagnetic material layer in such a structure can be a stacked film.

A magnetic head of the present invention can be applied in a reproducing head of such as a magnetic recording/reproducing head. The magnetic head of the present invention can, by further comprising a pair of magnetic poles and a recording magnetic gap, constitutes a magnetic recording/reproducing head.

A magnetic recording/reproducing head can be mounted on a magnetic recording device such as a magnetic disc unit. The magnetic recording device comprises, for example, a magnetic recording medium and a head slider equipped with a magnetic recording/reproducing head which records a signal from a magnetic field to the magnetic recording medium and reads a signal through a magnetic field generated from the magnetic recording medium.

In addition, the exchange-coupling film of the present invention can be applied in a magnetic memory device as described below. The magnetic memory device comprises a magneto-resistance effect film which has an exchange-coupling film of the present invention, a ferromagnetic film thereof being constituted of a magnetic multi-layered film including a stacked structure of ferromagnetic material layer/non-magnetic material layer/ferromagnetic material layer, one of the ferromagnetic material layer being pinned in its magnetization by the antiferromagnetic film, a write electrode for memorizing information in the magneto-resistance effect film, and a read electrode to reproduce information memorized in the magneto-resistance effect film.

DESCRIPTION OF THE PREFERRED EMBODIMENTS

In the following, embodiments for implementing the present invention will be described with reference to drawings.

Figure 1:
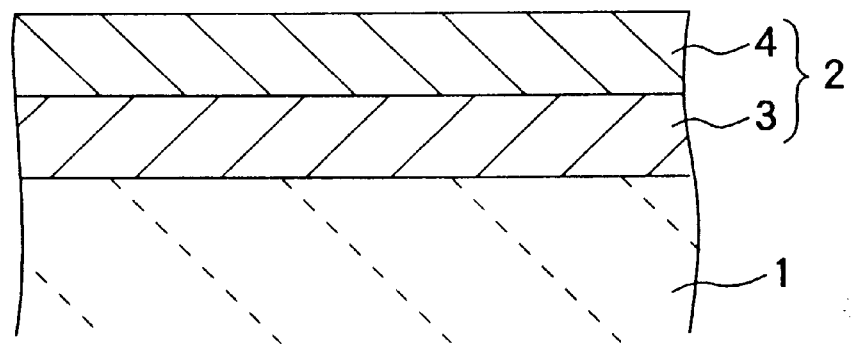
FIG. 1 is a sectional view showing a constitution of one embodiment of an exchange-coupling film of the present invention.

FIG. 1 is a diagram schematically showing a structure of one embodiment of an exchange-coupling film of the present invention. An exchange-coupling film 2 formed on a substrate 1 comprises a stacked antiferromagnetic film 3 and a ferromagnetic film 4. It may be as well for an antiferromagnetic film 3 and a ferromagnetic film 4 to be stacked at least in part to induce exchange-coupling therebetween.

Here, stacking order between an antiferromagnetic film 3 and a ferromagnetic film 4 is determined according their application form. Though, in FIG. 1, a state is shown in which the ferromagnetic film 4 is disposed on the upper side of the antiferromagnetic film 3, the antiferromagnetic film 3 can be disposed on the upper side of the ferromagnetic film 4. Further, an exchange-coupling film can be formed by a stacked film obtained by stacking multiply the antiferromagnetic film 3 and the ferromagnetic film 4.

An antiferromagnetic film 3 is consisted of an antiferromagnetic material including at least one kind of R element selected from Ir, Rh, Pt, Au, Ag, Co, Pd, Ni, Cr, Ge, Ru, Re and Cu, and Mn. As a concrete example of such an antiferromagnetic material, an antiferromagnetic alloy such as an RMn alloy substantially expressed by

$$\text{general formula: } R_{x'}Mn_{100-x'} \quad (1)$$

(in the formula, x expresses number satisfying $2 \leq x \leq 80$ at %) or an RMnFe alloy substantially expressed by

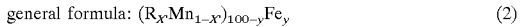

$$\text{general formula: } (R_{x'}Mn_{1-x'})_{100-y}Fe_y \quad (2)$$

(in the formula, x expresses number satisfying $0.02 \leq x' \leq 0.80$, and y expresses number satisfying $0<y<30$ at %) can be cited. The crystal structure of the antiferromagnetic alloy, according to the kind of the R element or composition thereof, can be a face-centered cubic structure, a face-centered tetragonal structure, a body-centered cubic structure, or a body-centered tetragonal structure.

Figure 2:
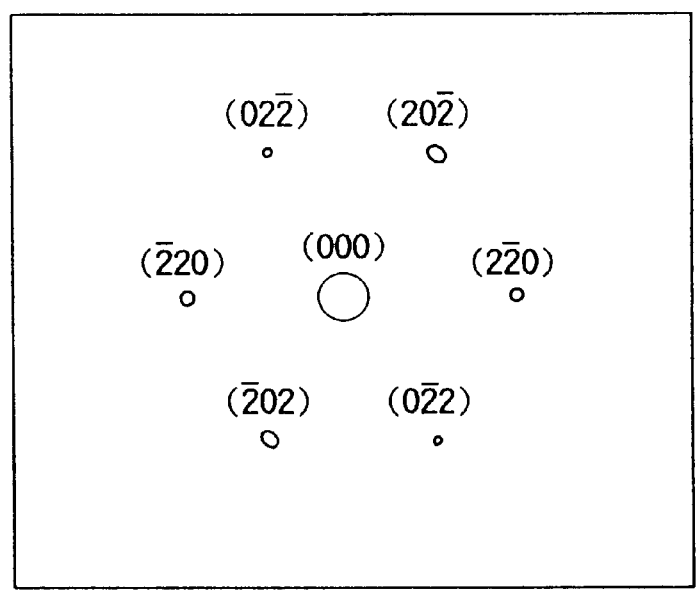
FIG. 2 is a diagram showing schematically one example of an electron beam diffraction pattern of an antiferromagnetic film of an exchange-coupling film of the present invention.

An antiferromagnetic film 3 consisting of such as the above described RMn alloy or RMnFe alloy(hereinafter referred to, as a whole, as the RMn based alloy) possesses a texture in which crystalline directions between grains within one plane are lined up with axes parallel. That is, an antiferromagnetic film 3 is a film oriented within one plane. According to an antiferromagnetic film 3 which is oriented within one plane, when, for example, the antiferromagnetic film 3 has a face-centered cubic crystal structure, if an electron beam diffraction is conducted with respect to this film surface, an electron beam diffraction pattern such as shown in FIG. 2 is obtained. From the electron beam diffraction pattern shown in FIG. 2, it is obvious that the antiferromagnetic film 3 is to be in (111) orientation. Further, diffraction points due to incidence of an electron beam from (111) direction, though dragging a little bit of lines but narrow in its breadth, are put in at most within ±15°.

In an exchange-coupling film 2 between an antiferromagnetic film 3 which has such an in-plane orientation and a ferromagnetic film 4, not only the blocking temperature but also the exchange-coupling force itself can be enhanced. Since a film having an in-plane orientation is lined up with axes parallel as to direction of its magnetic moment and is excellent in its conformity at the interface, when exchange-coupled with the ferromagnetic film 4, still larger exchange-coupling force can be obtained.

When the diffraction point due to the incidence of the electron beam drags a line and the breadth of the line exceeds ±15°, there is a great concern that the performance of the RMn based alloy can not be fully exhibited. Like this, the antiferromagnetic film 3 of the present invention possesses at least a part of a fabric domain where each diffraction point of the electron beam diffraction pattern is accommodated within ±15°. In addition, when the breadth of each diffraction point of the electron beam diffraction pattern of the antiferromagnetic film 3 is within ±15°, strain within the film can be alleviated. Therefore, even in a magnetic head wherein a thick film is stacked on the antiferromagnetic film 3, deterioration of the exchange-coupling force due to increase of the internal stress can be prevented.

Figure 3:
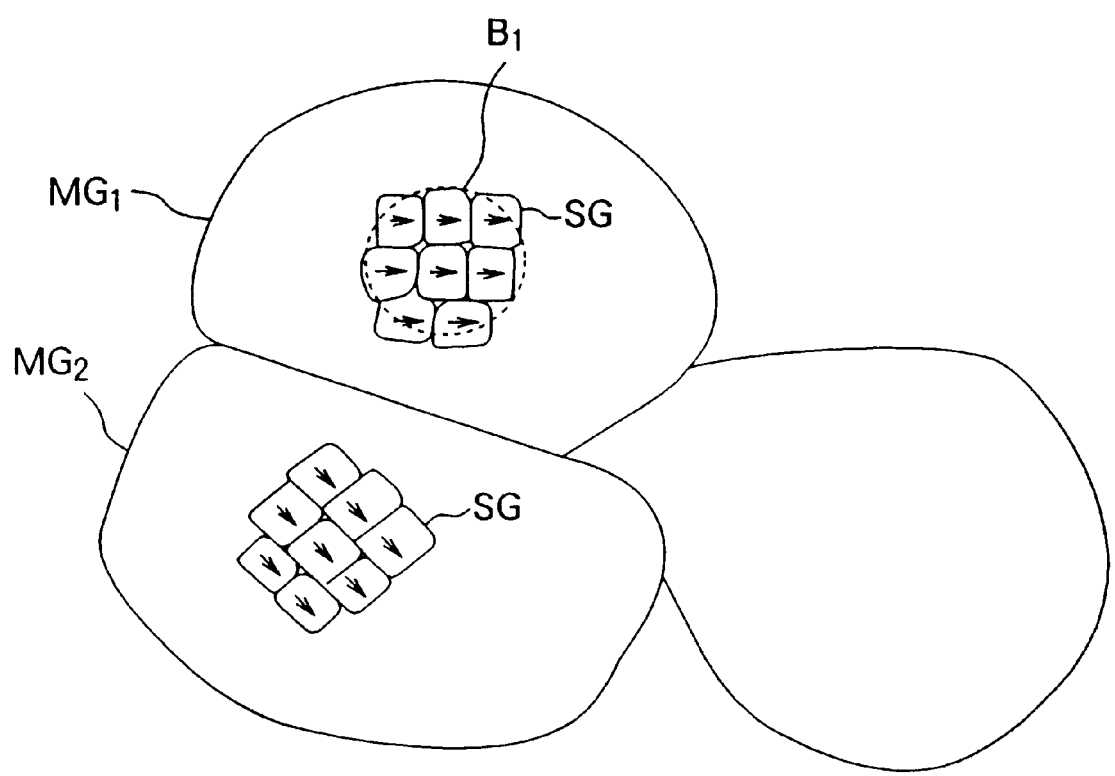
FIG. 3 is a diagram schematically showing a fine structure of an antiferromagnetic film.
Figure 4A:
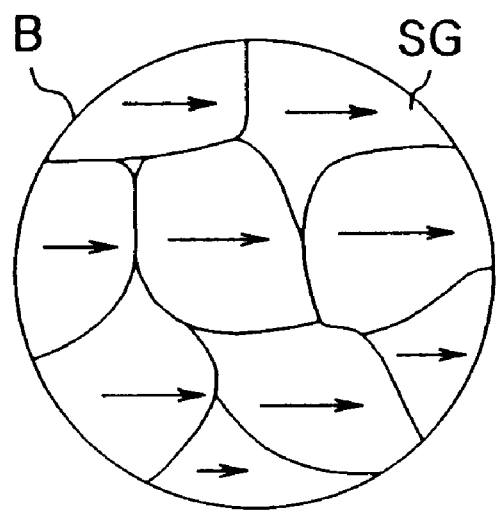
FIG. 4A is a diagram showing one example of a crystalline orientation within one plane of a sub-grain of an antiferromagnetic film.
Figure 4B:
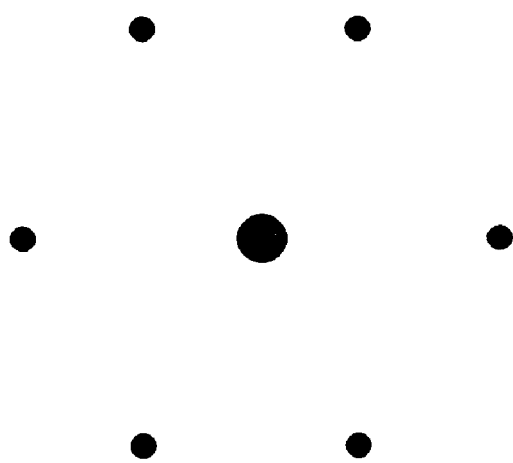
FIG. 4B is a diagram schematically showing an electron beam diffraction pattern of the antiferromagnetic film shown in FIG. 4A.

Here, the antiferromagnetic film, as shown in FIG. 3, has a fine structure consisting of, for example, a conglomerate of main grain MG. In one main grain MG, a lots of sub-grains SG exist. When an electron beam diffraction is conducted by irradiating an electron beam B1 from film surface direction onto such a main grain MG, as shown in FIG. 4A, if the in-plane crystalline direction of the sub-grain SG (shown by arrows in FIG. 4A; for example, (220) direction) is lined up with axes parallel, as shown in FIG. 4B, each diffraction point of the electron beam diffraction pattern is expressed by a point.

Figure 5A:
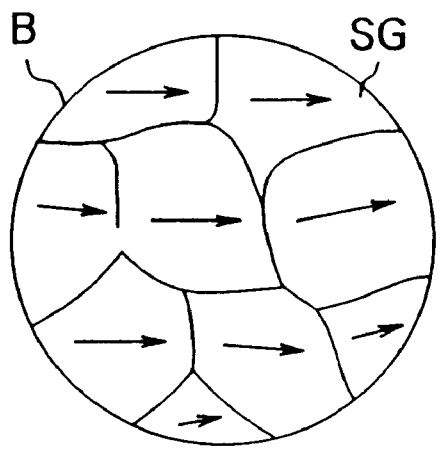
FIG. 5A is a diagram showing another example of a crystalline orientation within one plane of a sub-grain of an antiferromagnetic film.
Figure 5B:
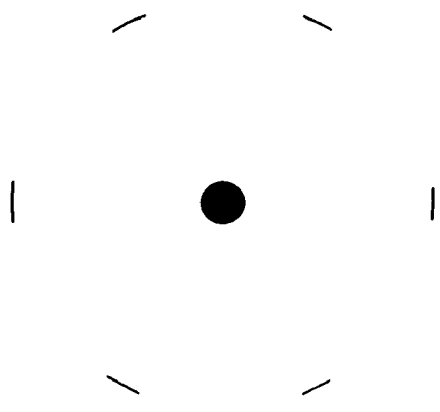
FIG. 5B is a diagram schematically showing an electron beam diffraction pattern of the antiferromagnetic film shown in FIG. 5A.
Figure 6A:
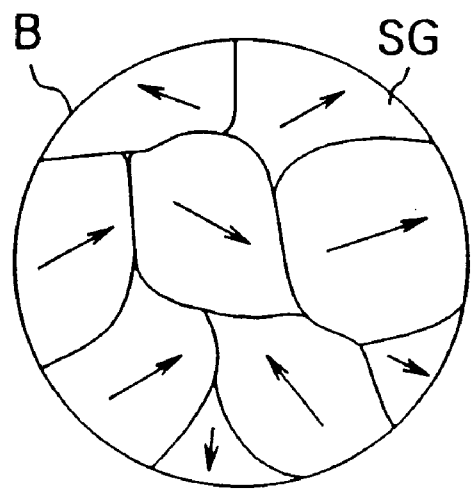
FIG. 6A is a diagram showing still another example of a crystalline orientation within one plane of a sub-grain of an antiferromagnetic film.
Figure 6B:
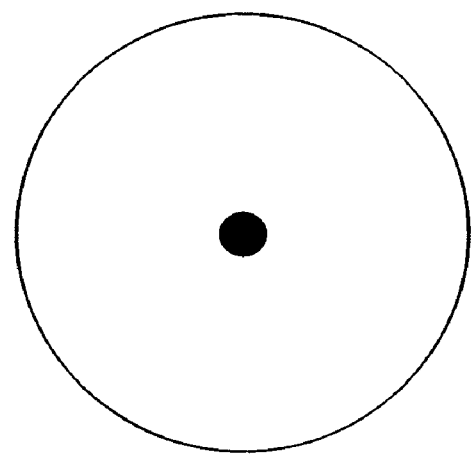
FIG. 6B is a diagram schematically showing an electron beam diffraction pattern of the antiferromagnetic film shown in FIG. 6A.

As shown in FIG. 5A, if the crystalline direction of the sub-grain SG fluctuates a little bit, as shown in FIG. 5B, each diffraction point of the electron beam diffraction pattern is agglomerated to form an elongated line of points. The antiferromagnetic film of the present invention is characterized in that it has a region where the distribution of the diffraction points can be settled within ±15°. Besides, as shown in FIG. 6A, for example, even if it is in (111) orientation along film thickness direction but if it is not lined up with axes parallel in its in-plane crystalline direction of the sub-grain SG, as shown in FIG. 6B, each diffraction point in the diffraction pattern is connected to become ring-like shape formed of a lots of diffraction points.

The antiferromagnetic film of the present invention, as described above, has only to be lined up with axes parallel in their in-plane crystalline orientations of the sub-grains SG in one main grain MG. In specific, it has only to have an area where the distribution of each diffraction point of the electron beam diffraction pattern can be settled within ±15°. For example, as shown in FIG. 3, even if there exists an area where the in-plane crystalline orientations are different between the main grains MG(for example between MG1 and MG2), that can be allowed in the present invention.

Figure 7:
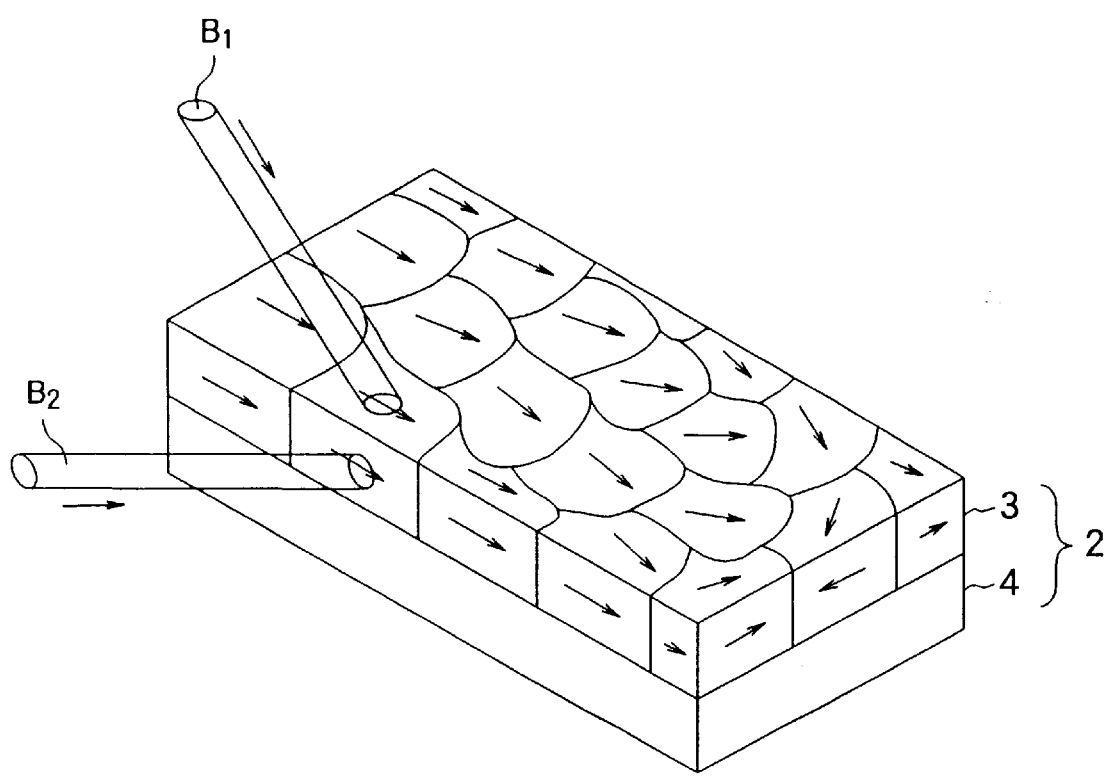
FIG. 7 is a diagram for explaining a method for identifying a crystalline orientation within a plane of an antiferromagnetic film with an electron beam diffraction.

Further, whether the antiferromagnetic film 3 is in in-plane orientation or not can be identified not only by the electron beam diffraction from the film surface direction but also by the electron beam diffraction to a cross-section of the film thickness direction. For example, as shown in FIG. 7, an electron beam $B_2$ is irradiated to a film cross-section of the antiferromagnetic film 3. As the electron beam $B_2$, that has a beam diameter of about 1nm due to an FE-TEM method (nm-probe) is used.

Figure 8:
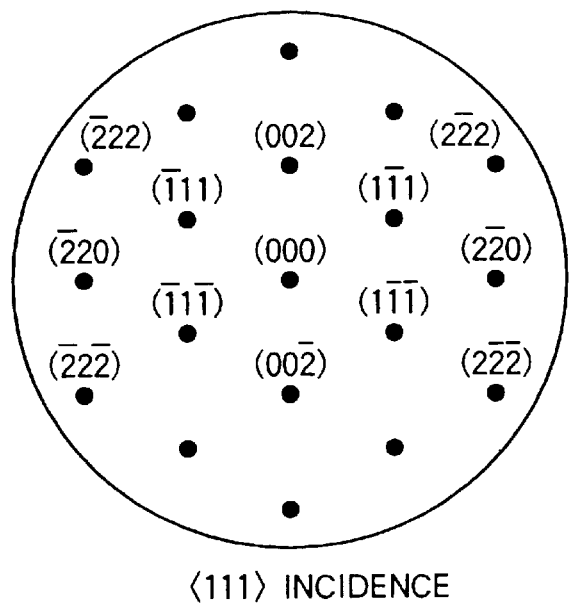
FIG. 8 is a diagram showing one example of an electron beam diffraction pattern obtained for a film cross-section of an antiferromagnetic film oriented within one plane.
Figure 9:
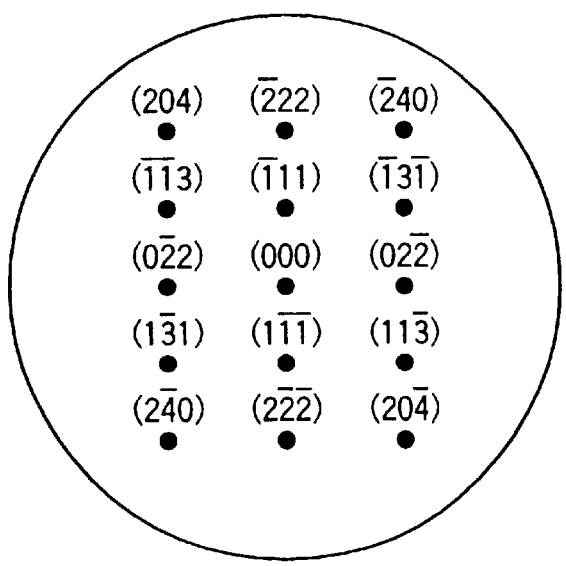
FIG. 9 is a diagram showing another example of an electron beam diffraction pattern obtained for a film cross-section of an antiferromagnetic film oriented within one plane.

For example, when the antiferromagnetic film has a face-centered cubic crystal structure, an electron beam diffraction pattern from a film surface direction of the antiferromagnetic film oriented in-plane is as shown in FIG. 2. When the electron beam diffraction to the film cross-section of such an antiferromagnetic film 3 is executed, particular electron beam diffraction pattern as shown in FIG. 8 or FIG. 9 is obtained depending on the incident direction of the electron beam $B_2$. From these, the antiferromagnetic film 3 is identified as to be in in-plane orientation. Further, FIG. 8 is a diffraction pattern obtained by irradiating the electron beam $B_2$ from (111) direction. FIG. 9 is a diffraction pattern obtained by irradiating the electron beam $B_2$ from (211) direction.

The antiferromagnetic film 3 consisting of such as the above described RMn based alloy further has grain diameter of 5 nm or more. Here, since the RMn based alloy has intrinsically high Neel temperature, the blocking temperature of an exchange-coupling film 2 formed between such an antiferromagnetic film 3 and a ferromagnetic film 4 can be heightened. By increasing the grain diameter of the antiferromagnetic film 3 to 5 nm or more, it becomes possible to exhibit the performance which the RMn based alloy intrinsically possesses with stability. Therefore, excellent exchange-coupling force can be obtained both at room temperature and high temperature region with stability and reliability of the exchange-coupling film 2 can be improved.

Further, by increasing the grain diameter of the antiferromagnetic film 3 to 5 nm or more, strain inside the antiferromagnetic film 3 can be alleviated. If there is strain in the antiferromagnetic film, when a structure such as a magnetic head in which a thick film is stacked on the antiferromagnetic film is taken, internal stress of the antiferromagnetic film is further increased to result in decrease of the exchange-coupling force. Thereby, the head performance or the like deteriorates. By alleviating the strain within a film through the increase of the grain diameter of the antiferromagnetic film 3 to 5 nm or more, performance deterioration due to the strain can be suppressed.

The grain diameter of the antiferromagnetic film 3, to further improve the performance of the antiferromagnetic film 3 itself, is more preferable to be 10 nm or more. There is no particular upper limit of the grain diameter of the antiferromagnetic film 3, and it can be made to have a value corresponding to the film thickness. Further, the antiferromagnetic film 3 can be a film made up of a single crystal. In the present invention, when the antiferromagnetic film 3 has a crystal structure consisting of main grain and sub-grain in the main grain, the average grain diameter of the present invention is defined to indicate the grain diameter of the main grain.

The antiferromagnetic film 3 in-plane oriented, when formed in film by, for example, a sputtering method, can be obtained with reproducibility by employing an alloy target of low oxygen concentration and by controlling the oxygen concentration in a film formation chamber. According to such a film forming method, the grain diameter of the antiferromagnetic film 3 can be made large such as 5 nm or more. It is preferable for the oxygen content in the employed alloy target to be 1% by weight or less. By decreasing the oxygen content in the alloy target to 1% by weight or less, even in the case of a Mn-rich alloy target, high densification can be attained.

The decrease of the oxygen content of an alloy target and high densification thereof contribute largely to highly purify the antiferromagnetic film formed in film using thereof, in particular, to lower the oxygen concentration. Further, they also contribute in improvement of the film quality or the film composition(deviation from the target composition) of the antiferromagnetic film 3. The high purification of the antiferromagnetic film 3 directly affects the crystalline direction between grains or the grain diameter. That is, when the antiferromagnetic film 3 is highly purified, the antiferromagnetic film 3 oriented within its plane can be obtained with reproducibility. Further, when the antiferromagnetic film 3 is highly pure, since grain growth of the RMn based alloy can be promoted, the antiferromagnetic film 3 having the grain diameter of 5 nm or more can be obtained with reproducibility. The density of a target to be employed, from the reasons above described, is preferable to be 90% or more.

An alloy target consisting of an RMn based alloy can be obtained by sintering or melting alloy powder between R element and Mn or a powder mixture thereof. In this case, by producing a target employing hot press or HIP method while employing high purity powder as a starting material or preventing increase of the impurity during mixing, the oxygen content in the target can be decreased to 1% by weight or less. The oxygen content in an alloy target is more preferable to be reduced to 0.7% by weight or less. The sintering means can be an atmospheric sintering if it can form a Mn compound.

Further, a back pressure when an antiferromagnetic film 3 is formed in film by the sputtering method is preferable to be better than $10^{-8}$ Torr. According to such a back pressure, since mingling of the oxygen during film formation can be suppressed, the purity of the antiferromagnetic film 3 can be further improved. Thereby, the orientation within a plane of the antiferromagnetic film 3 can be enhanced. The in-plane orientation tendency or the grain diameter of the antiferromagnetic film 3 can be also improved by forming a film by use of substrate heating during film formation, rotation of the target, high purity Ar, or Xe gas.

In an RMn based alloy expressed in the above described equation (1), the R, as described above, is consisting of at least one kind of element selected from Ir, Rh, Pt, Au, Ag, Co, Pd, Ni, Cr, Ge, Ru, Re and Cu, in such a combination as CrPtMn or PdPtMn, the exchange-coupling property can be enhanced. When the content of such R element is too low, there is a tendency that the corrosion resistance decreases, on the contrary, when the content of the R element is too much, anti-ferromagnetism decreases. Therefore, x value which defines the R element quantity is preferable to be in the range of from 2 to 80 at %, more preferable is to be in the range of from 10 to 70 at %.

In an RMnFe alloy expressed in equation (2), x' value which defines the R element quantity is preferable to be in the range of from 0.02 to 0.80 from the similar reasons. Fe, by enhancing lattice matching between the RMnFe alloy and the ferromagnetic film 4, has function to enhance the exchange-coupling force of the exchange-coupling film 2. However, since, when the content of Fe becomes 30 at % or more, the corrosion resistance drastically deteriorates, the content of Fe should be 30 at % or less. More preferable Fe content is in the range of $0.01 \leq y \leq 25$ at %.

More preferable composition range of an RMn alloy, when the R is Ir, Rh, Au, Ag, Co, Ge, Ru, Re, is $2 \leq x \leq 50$ at %. An RMn alloy including the above described R element becomes stable generally in the crystal structure of a face-centered cubic crystal system when x is in the composition range of from 2 to 50 at %. An RMn alloy at least a part of which crystal structure takes a face-centered cubic system, due to its particularly high Neel temperature, can be further improved in its blocking temperature of the exchange-coupling film 2. An RMn alloy which has a crystal structure of a face-centered cubic crystal system is generally excellent in the lattice matching with a ferromagnetic film 4 which has a crystal structure of a face-centered cubic system or a hexagonal close-packed crystal structure. From the similar reason, the composition ratio of the R element in an RMnFe alloy is also preferable to be $2 \leq x \leq 50$ at %. The x value is desirable to be in the range of from 5 to 40 at %.

A bulk of the RMn alloy including the above described R element becomes generally stable in a crystal structure of a face-centered cubic crystal system when x is in the composition range of from 35 to 60 at %. However, when an antiferromagnetic film 3 consisting of the RMn alloy is epitaxially grown on an under layer consisting of Cu of a crystal structure of a face-centered cubic system or on the ferromagnetic film 4 mainly consisting of Fe, Co, Ni or alloys formed therebetween similarly possessing a face-centered cubic crystal structure, even when x is in the composition range of $40 \leq x \leq 70$ at %, an RMn alloy of a crystal structure of a face-centered cubic system can be obtained.

When the R is Ni, Pd, thermal stability can be improved when the crystal structure is a face-centered tetragonal crystal system. Therefore, to set x at such a composition range where the crystal structure is stable, that is, to set at $30 \leq x \leq 70$ at % is preferable. Further, when the R is Cr, the RMn alloy can take a body-centered cubic structure or a body-centered tetragonal structure, the composition range is preferable to be in the range of $30 \leq x \leq 70$ at %. Still further, when the R is Pt, both the face-centered cubic system and the face-centered tetragonal system are thermally stable, the composition ranges of $2 \leq x \leq 30$ at % or $40 \leq x \leq 70$ at % is preferable.

From the similar reason, also the x' value which defines the R element quantity in an RMnFe alloy is preferable to be set in the composition range identical with the above described RMn alloy according to the kind of the R element.

An antiferromagnetic film 3 consisting of an RMn based alloy can further includes at least one kind of additional component selected from Ta, Hf, Ti, Nb, Si, Al, W, Zr, Ga, Be, In, Sn, V, Mo, Ru, Os, Cd, Zn and N. In the RMn based alloy, although fully excellent corrosion resistance compared with the conventional FeMn alloy can be obtained based on the above described composition range or the crystal structure, the corrosion resistance can be further enhanced by including such an additional component.

However, when the above described additional component is included too much quantity, there is a concern that the exchange-coupling force of the exchange-coupling film 2 decreases. Therefore, the compounding quantity of the above described element is preferable to be 50 at % or less relative to the RMn based alloy, more preferable is to be 30 at % or less.

An antiferromagnetic film 3 consisting of an RMn based alloy is preferable at least a part of which to have an ordered phase. It is because, by ordering the atomic arrangement of the antiferromagnetic film 3 consisting of the RMn based alloy, the Neel temperature rises to result in rising of the blocking temperature of the exchange-coupling film 2. Reliability of the exchange-coupling film 2 is improved and, further, the exchange-coupling force itself between the antiferromagnetic film 3 and the ferromagnetic film 4 can be increased.

In addition, when an antiferromagnetic film 3 is formed by an RMn based alloy, in an as-depo state immediately after the formation of the antiferromagnetic film 3, a disordered phase is normally predominant. By implementing heat treatment of around from 373 to 573 K. to this, an ordered phase such as $Cu_3Au$ type, CuAu type appear.

The film thickness of the antiferromagnetic film 3 consisting of an RMn based alloy is not restricted if it is in the range which can exhibit anti-ferromagnetism. In an exchange-coupling film 2, in order to obtain a particularly large exchange-coupling force, it is preferable for the film thickness of the antiferromagnetic film 3 to be thicker than that of the ferromagnetic film 4. When the antiferromagnetic film 3 is stacked on the upper side of the ferromagnetic film 4, from the view-point of stability of the exchange-coupling force after the heat treatment, the film thickness of the antiferromagnetic film 3 is preferable to be in the range of about from 3 to 20 nm for a face-centered cubic system, further preferable to be 15 nm or less. For a face-centered tetragonal system, the range of about from 15 to 40 nm is preferable. From the same view point, the film thickness of the ferromagnetic film 4 is preferable to be 1 nm or more and 3 nm or less. Besides, when the antiferromagnetic film 3 is stacked under side of the ferromagnetic film 4, the film thickness of the antiferromagnetic film 3 is preferable to be in the range of about from 3 to 50 nm. The film thickness of the ferromagnetic film 4 is preferable to be from 1 to 7 nm. Here, a layer called as a pinning layer can be a stacked structure. The film thickness of the ferromagnetic film 4 in this case is a thickness of a layer substantially contacting with the antiferromagnetic film 3.

For a ferromagnetic film 4, a ferromagnetic material layer of a single-layer structure consisting of Fe, Co, Ni or alloy formed therebetween, or a magnetic multi-layered film or a granular film both of which show ferromagnetic property can be employed. As a specific ferromagnetic film 4, an anisotropic magneto-resistance effect film (AMR film) or a giant magneto-resistance effect film (GMR film) such as a spin valve film, an artificial lattice film, a granular film, a ferromagnetic tunnel junction film can be cited.

Among the above described ferromagnetic material, since Co or Co alloy in particular, by stacking with the antiferromagnetic film 3 consisting of the RMn based alloy, can obtain an exchange-coupling film 2 extremely high in its blocking temperature, it can be used preferably. When the ferromagnetic film 4 is an MR film, a Co alloy obtained by adding Fe, Ni, other element to Co is preferable because of its large MR change rate.

As an element to be added to the Co alloy, other than the above described Fe or Ni, one or more than two kind of Pd, Au, Ag, Cu, Pt, Ir, Rh, Ru, Os, Hf, can be used. The additional element quantity of these elements is preferable to be in the range of from 5 to 50 at %. Further, it is preferable to use a CoFe alloy containing from 5 to 40 at % of Fe. A Co alloy including Fe is very advantageous in enhancing the exchange-coupling force between the ferromagnetic film 4 and the antiferromagnetic film 3. Further, the ferromagnetic film 4 can be a composition modulation film or a laminate film of different compositions.

Further, like a spin valve film which will be described later, when a ferromagnetic film 4 has a magnetic multi-layered film including a stacked structure of ferromagnetic layer/non-magnetic layer/ferromagnetic layer, the constituent element Ni of NiFe based alloy forms a complete solid solution with Cu frequently used as a non-magnetic material layer. Therefore, during manufacturing process of an MR element or a magnetic head, diffusion takes place due to temperature rise to around 473 K. and, even after heat treatment in a magnetic field, the change rate of the resistance can not be reproduced to result in decrease.

Besides, Co does not form a solid solution with Cu, even after exposure to the temperature of around 623 K. during manufacturing process of the MR element or the magnetic head, by applying the heat treatment in a magnetic field, the original resistance change rate can be retrieved. Further, although NiMn, PdMn, PtMn of the face-centered cubic crystal system do not exhibit the exchange-coupling as-depo state, by implementing an anneal cycle at the temperature of around 543 K., the exchange-coupling can be obtained. From the view-point of being able to endure such an anneal cycle, it can be said that the Co based ferromagnetic material is suitable for a constituent material of the ferromagnetic film 4.

From such reasons, a ferromagnetic film 4 is preferable to have a Co or a Co alloy layer of at least a crystal structure of a face-centered cubic crystal system or a hexagonal close-packed crystal structure. Crystallinity or the like of the ferromagnetic film 4 is not particularly restricted, it can be a crystalline highly oriented film or can be not so highly oriented one. Further, a micro-crystallite film or an amorphous film can be used.

An exchange-coupling film 2 is formed on one of the various kinds of substrate 1 such as a non-crystalline substrate such as glass, resin, a single crystal substrate such as Si, MgO, $Al_2O_3$, Altic($Al_2O_3$/TiC), ferrite, an oriented substrate, a sintered substrate, with various kinds known film forming method such as a sputtering method, an evaporation method, MBE method. When being employed in an MR element or a magnetic head, it can be formed on the various kinds of under layer according to their structure. The film formation method of the exchange-coupling film 2 is not particularly restricted, in order to obtain an antiferromagnetic film 3 oriented within a plane, it is preferable to apply a film obtained by sputtering method using an alloy target of the above described low oxygen concentration.

On the substrate 1 to be formed thereon the exchange-coupling film 2, an under film of a thickness of about from 1 to 100 nm can be disposed. Although the under film is not particularly restricted if the crystallinity of the antiferromagnetic film 3 or the ferromagnetic film 4 can be improved, a noble metal such as Pd or Pt, an amorphous metal such as a CoZrNb, a metal or alloy of a face-centered cubic crystal structure or a body-centered cubic crystal structure such as Ta, Ti, Cu alloy can be used. Further, to provide a uniaxial anisotropy to coupling between the antiferromagnetic film 3 and the ferromagnetic film 4, film formation in a magnetic field or heat treatment in a magnetic field can be undertaken. The heat treatment is also effective to make appear an ordered phase.

The exchange-coupling film 2 of the above described embodiment can be used effectively to eliminate Barkhausen noise of the ferromagnetic film in the magneto-resistance effect element(MR element), or to pin down magnetization of the ferromagnetic film in an artificial lattice film or a spin valve film. However, the exchange-coupling film 2 is not restricted in its application to the MR element, but can be applied in various kinds such as magnetic anisotropy control of a magnetic yoke consisting of a ferromagnetic film.

Next, embodiments of a magneto-resistance effect element (MR element) in which the above described kind of exchange-coupling film is used will be described with reference to FIG. 10 through FIG. 13. Although the MR element is effective as, for example, a reproducing element of a magnetic head of a magnetic recording device such as a HDD or a magnetic field sensor, it can be also used for, other than those above described, a magnetic memory device such as a magneto-resistance effect memory (MRAM (Magnetoresistive Random Access Memory)).

Figure 10:
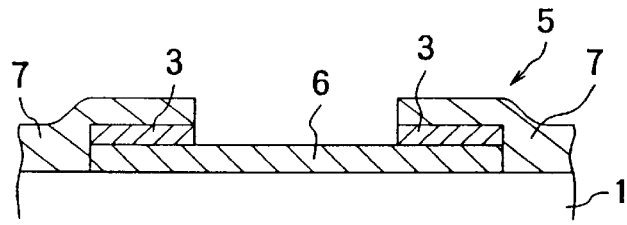
FIG. 10 is a sectional view showing an outline structure of one embodiment in which an AMR element of the present invention is applied.

First of all, an embodiment in which an MR element of the present invention is employed in a magnetic reproducing head will be described. FIG. 10 shows a constitution example of an AMR element 5 in which an exchange-coupling film of the present invention is used for eliminating Barkhausen noise of an anisotropic magneto-resistance effect film (AMR film).

The AMR element 5 has, as a ferromagnetic film, an AMR film 6 consisting of a ferromagnetic material such as $Ni_{80}Fe_{20}$ of which electric resistance varies depending on an angle which the direction of an electric current and magnetic moment of the magnetic film form. On both edge portions of the AMR film 6, the antiferromagnetic film 3 is stacked respectively. These of AMR film 6 and antiferromagnetic film 3 constitute an exchange-coupling film, a magnetic bias is given to the AMR film 6 from the antiferromagnetic film 3.

Further, on both edge portions of the AMR film 6, a pair of electrodes consisting of Cu, Ag, Au, Al, alloys formed therebetween and electrically connected through the antiferromagnetic film 3 are formed. Through the pair of electrodes 7, an electric current(sense current) is supplied to the AMR film 6. An AMR element 5 is made up of these of an AMR film 6, an antiferromagnetic film 3 and a pair of electrodes 7. Here, the electrode 7 can directly contacts the AMR film 6. Further, each constituent element is formed on one main surface of the substrate 1 consisting of such as $Al_2O_3$/TiC.

Figure 11:
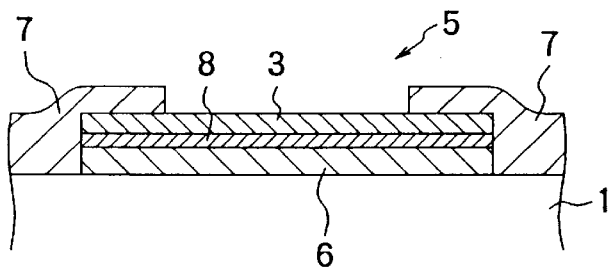
FIG. 11 is a sectional view showing a modification example of the AMR element shown in FIG. 10.

In the above described AMR element 5, by giving a magnetic bias to the AMR film 6 through taking advantage of the exchange-coupling between the AMR film 6 and the antiferromagnetic film 3, a magnetic domain is controlled. By magnetic domain control of the AMR film 6, occurrence of Barkhausen noise can be suppressed. Supply of the magnetic bias to the AMR film 6 through the antiferromagnetic film 3, as shown in FIG. 11, can be materialized with a structure in which the antiferromagnetic film 3 is stacked on the AMR film 6 through an exchange bias magnetic field control film 8. The AMR film 6 and the antiferromagnetic film 3 are exchange-coupled through the exchange bias magnetic field control film 8. Here, a pair of electrodes 7 are formed in such a manner that a part of the electrode is stacked on the both edge portions of the antiferromagnetic film 3.

In an AMR element 5, when an exchange-coupling film of the present invention is used for supplying the magnetic bias to the AMR film 6, as described above, since the antiferromagnetic film 3 consisting of the RMn based alloy can fully and with stability exhibit its primary characteristics, the exchange-coupling force sufficient large at room temperature and at high temperature region can be obtained. Therefore, the occurrence of Barkhausen noise can be suppressed under various conditions with reproducibility.

Figure 12:
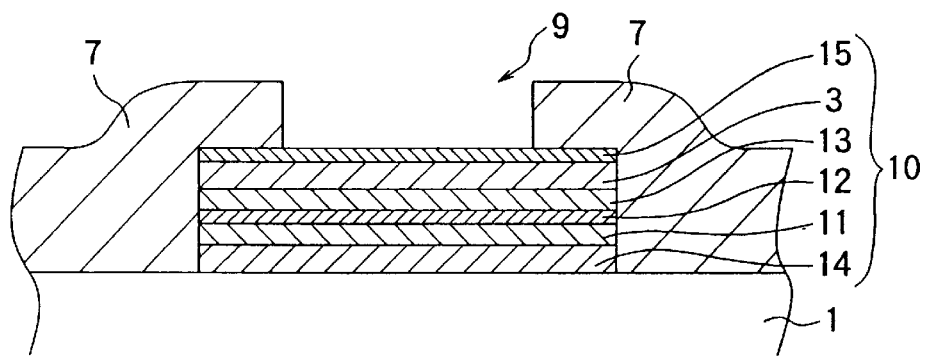
FIG. 12 is a sectional view showing an outline structure of one embodiment in which a GMR element of the present invention is applied.

FIG. 12 shows one constitution example of a GMR element 9 in which an exchange-coupling film of the present invention is applied to pin down magnetization of the ferromagnetic layer of a giant magneto-resistance effect film (GMR film). The GMR element 9 has a GMR film 10 as a ferromagnetic film.

A GMR element 9 shown in FIG. 12 has a GMR film (spin valve GMR film) 10 consisting of a spin valve film. The spin valve GMR film 10 has a sandwich film of ferromagnetic material layer 11/non-magnetic material layer 12/ferromagnetic material layer 13. Among these, on the upper side ferromagnetic material layer 13, the antiferromagnetic film 3 is stacked, the ferromagnetic material layer 13 and the antiferromagnetic film 3 make up an exchange-coupling film. The upper side ferromagnetic layer 13 is a so-called magnetization pinning layer of which magnetization is pinned down through the exchange-coupling force with the antiferromagnetic film 3. Besides, the lower side ferromagnetic material layer 11 is a so-called magnetization free layer of which magnetization direction varies due to a signal magnetic field (external magnetic field) from a magnetic recording medium.

A ferromagnetic material layer 11 is formed on a magnetic under layer 14 as occasion arises. The magnetic under layer 14 can be made of one kind of magnetic film or can be a stacked film of different kinds of magnetic films. As a magnetic under layer 14, an amorphous based soft magnetic material or a soft magnetic material having a face-centered cubic crystal structure, such as a NiFe alloy, a NiFeCo alloy, and alloys obtained by addition of various kind of additional element to them, can be used. Further, a laminate film obtained by stacking an amorphous based soft magnetic material and a soft magnetic material having a face-centered cubic crystal structure can be used preferably, wherein, it is preferable, in order to enhance crystallinity of a spin valve GMR film 10, to form in such a manner that the soft magnetic material having a face-centered cubic crystal structure contact with the ferromagnetic material layer 11. Further, instead of an amorphous based soft magnetic material, a metal or an alloy of face-centered cubic crystal structure or face-centered tetragonal crystal structure can be used. Further, they can be formed beneath the amorphous based soft magnetic material.

Further, to enhance orientation tendency, a further under layer of a thickness of about 1 through 100 nm can be disposed below the magnetic under layer 14. Although the under layer is not particularly restricted if it can improve the crystallinity or the orientation tendency, a noble metal such as Pd or Pt, an amorphous metal such as CoZrNb , a metal or alloy having face-centered cubic crystal structure or body-centered cubic crystal structure can be used. Further, in the figure, numeral 15 is a protective film consisting of Ta and the like and is formed as occasion arises. As a protective film, a material which can control lattice constant of the antiferromagnetic film 3 can be used. For instance, by applying compressive stress to the antiferromagnetic film 3 by the protective film, lattice constant can be controlled.

On both edge portions of the spin valve GMR film 10, a pair of electrodes 7 consisting of Cu, Ag, Au, Al, alloys formed therebetween are formed. With the pair of electrodes 7, an electric current (sense current)is supplied to the spin valve GMR film 10. A GMR element 9 is made up of the spin valve GMR film 10 and the pair of electrodes 7. Here, the electrodes can be formed on the lower side of the spin valve GMR film 10. The spin valve GMR film 10, as will be described in detail later, can have a hard bias film and the like as occasion demands.

For the ferromagnetic material layers 11,13, as described above, Co or a Co alloy can be preferably used. As a non-magnetic material layer 12 disposed between the ferromagnetic material layers 11,13, although various kinds of conductive non-magnetic material can be used, Cu large in its spin-dependent scattering can be preferably used.

Figure 13:
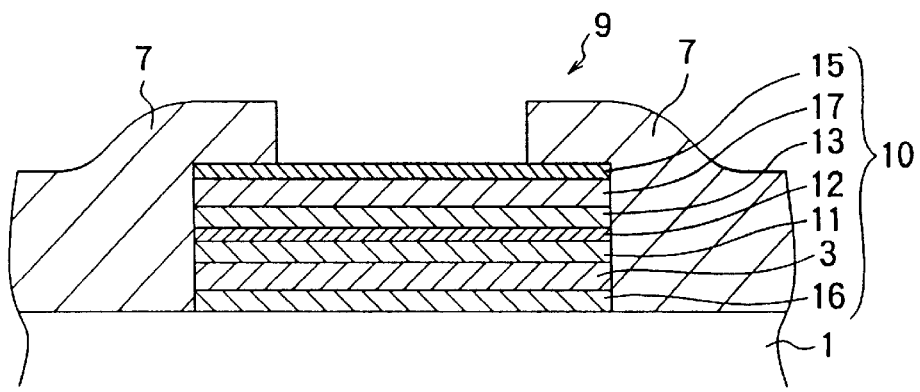
FIG. 13 is a sectional view showing a modification example of the GMR element shown in FIG. 12.

The positions of a magnetization pinning layer and a magnetization free layer in a spin valve GMR film 10 can be upside-down. FIG. 13 shows a spin valve GMR film 10 in which the magnetization pinning layer is disposed at the lower side. In the spin valve GMR film 10, the antiferromagnetic film 3 is formed on the side of the substrate 1 and a sandwich film of ferromagnetic material layer 11/non-magnetic material layer 12/ferromagnetic material layer 13 is formed on the antiferromagnetic film 3. In this case, the lower side ferromagnetic material layer 11 and the antiferromagnetic film 3 form an exchange-coupling film, wherein the lower side ferromagnetic material layer 11 is a magnetization pinning layer and the upper side ferromagnetic layer 13 is a magnetization free layer.

When the antiferromagnetic film 3 is formed on the substrate 1 side, in order to enhance stability of its crystal structure or crystalline orientation tendency, the antiferromagnetic film 3 can be disposed on the under film 16. Even when there is no under film 16, an RMn based antiferromagnetic material of the present invention grows with (111) orientation or (110) orientation. As the under layer 16, Ta, Zr, Nb, Cu, Cr, Hf, Ti can be used, an alloy having a face-centered cubic structure or a body-centered cubic structure can be used. According to the present invention, even in a composition region of, for example, 10≦x≦70 at % of the RMn based alloy, an underlaying structure of the antiferromagnetic film 3 can be realized with stability. That is, since, in the present invention, the effect particularly towards Mn-rich side is remarkable, the underlaying structure of the antiferromagnetic film 3 which is generally unstable can be materialized.

On an interface between the antiferromagnetic film 3 and the ferromagnetic material layer 11 which is a magnetization pinning layer, to enhance the exchange bias magnetic field to the ferromagnetic material layer 11 from the antiferromagnetic film 3, a magnetic film having an intermediate lattice constant therebetween can be inserted. Or, a magnetic ultra-thin layer can be inserted to stabilize a crystal structure of the ferromagnetic material layer 11. The ferromagnetic material layer can be a stacked film interposed a non-magnetic material layer intermediate.

On the ferromagnetic material layer 13 which is a magnetization free layer, a soft magnetic assist film 17 can be formed as occasion demands. In particular, when a Co alloy such as a CoFe alloy is used for the ferromagnetic material layer 13, it is preferable to enhance soft magnetism of the ferromagnetic material layer 13 by forming an soft magnetic assist film 17 consisting of a NiFe alloy, a NiFeX(X: at least one kind of element selected from Cr, Nb, Ta, Zr, Hf, W, Mo, V, Ti, Rh, Ir, Cu, Au, Ag, Mn, Re, Ru)alloy, an amorphous magnetic alloy such as a CoZrNb based, a CoFeRe based, a CoFeAlO based, a nitride micro-crystalline alloy such as FeZrN, CoFeTaN, a carbide micro-crystalline alloy such as CoNbC, FeTaC, or a laminate film therebetween.

In a spin valve type GMR element 9, when the exchange-coupling film of the present invention is used for pinning down magnetization of one ferromagnetic material layer, since, as described above, the primary performance of the antiferromagnetic film 3 consisting of such as an RMn based alloy can be exhibited fully and with stability and the exchange-coupling force sufficient at room temperature and at high temperature region can be obtained with stability, magnetization pinning state of the pinning layer becomes stable and strengthened. Thereby, excellent GMR characteristics can be obtained with stability.

Further, when a GMR element 9 is used in a magnetic recording/reproducing combination head and the like, performance deterioration due to multi-layer formation from the thick film can be prevented. Further, when the exchange-coupling film of the present invention is used, even in an antiferromagnetic film having a face-centered cubic crystal structure rich in Mn, excellent exchange-coupling with the lower side ferromagnetic material layer of the spin valve film can be obtained.

Further, in the GMR element 9 shown in FIG. 12 and FIG. 13, for the GMR film 10, an artificial lattice film having a multi-layered film made of the ferromagnetic material layer and a non-magnetic material layer, a ferromagnetic tunnel junction film, and the like can be used. Even in a ferromagnetic tunnel junction element, as identical as the spin valve type GMR element, an antiferromagnetic film is used for pinning the magnetization of one ferromagnetic material layer.

Next, an embodiment in which an MR element of the present invention is employed in a magneto-resistance effect memory (MRAM) will be described.

Figure 14:
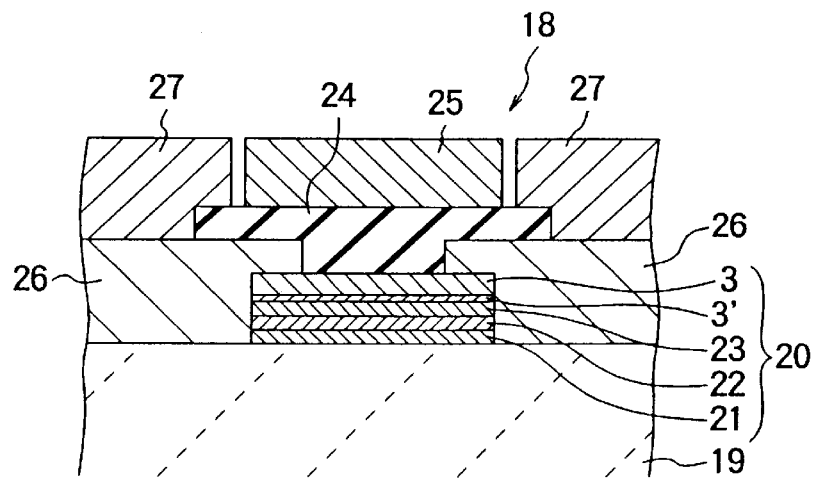
FIG. 14 is a sectional view showing a structural example where an MR element of the present invention is applied in an MRAR.

FIG. 14 is a diagram showing a structural example of an MRAM utilizing giant magneto-resistance effect(GMR). An MRAM 18 shown in the figure has a spin valve GMR film 20 formed on a substrate 19 such as a glass substrate or a Si substrate. For magnetization pinning of a ferromagnetic material layer 23 of the spin valve GMR film 20, an exchange-coupling film of the present invention is employed.

That is, on the substrate 19, a sandwich film of ferromagnetic material layer 21/non-magnetic material layer 22/ferromagnetic material layer 23 is formed. Among them, on the ferromagnetic material layer 23, an antiferromagnetic film 3 is formed through a control film 3' which controls the degree of the exchange-coupling force. In this case, an upper side ferromagnetic material layer 23 and an antiferromagnetic film 3 constitute an exchange-coupling film, wherein the upper side ferromagnetic material layer 23 is a magnetization pinning layer and the lower side ferromagnetic material layer 21 is a magnetization free layer.

Above the spin valve GMR film 20, a write electrode (word line) 25 is disposed through an insulation layer 24. Depending on the direction of an electric current when the electric current is flew through the write electrode, magnetization direction of the magnetization pinning layer 23 changes, according to which direction, "1" or "0" is determined.

On both edge portions of the spin valve GMR film 20, a pair of read electrodes (bit line) 27 are disposed through a shunt layer 26 consisting of Au and the like. With a pair of read electrodes 27, an electric current(sense current) is supplied to the spin valve GMR film 20. For reading data, a pulse electric current changing from plus to minus is flew through the write electrode 25 and read electrode 27. Here, magnetization direction of the magnetization free layer 21 changes, for example, from right-facing to left-facing. Accompanying this, resistance value of the spin valve GMR film 20 changes from the maximum to the minimum when the data of the magnetization pinning layer 23 is "1", and from the minimum to the maximum when the data of the magnetization pinning layer 23 is "0". Resistance change is read out to be outputted as voltage variation of the electrode 27. Thus, data memorized in the MRAM 18 can be read out.

Even in such an MRAM 18, an identical effect with a GMR element 9 for a magnetic head can be obtained. An integrated memory device is constituted by respectively disposing an MRAM 18 at each intersection portion between a plurality pieces of word lines and a plurality of pieces of bit lines intersecting therewith and by disposing them in an array shape on a single substrate.

Figure 15:
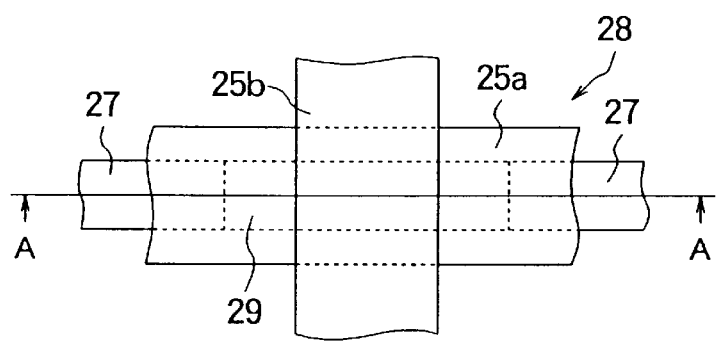
FIG. 15 is a plane view showing another structural example of an MRAM.
Figure 16:
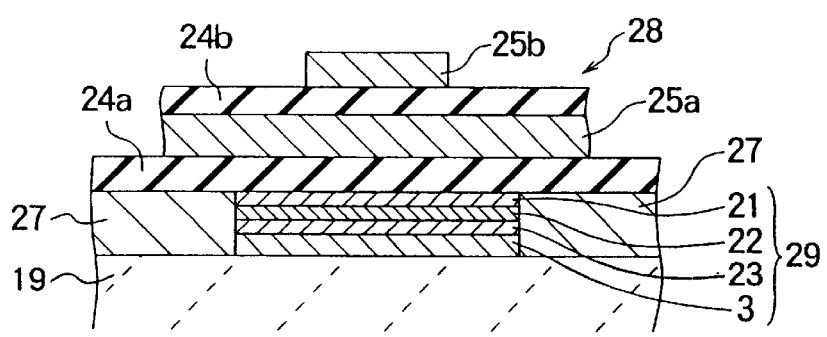
FIG. 16 is a sectional view of the MRAM shown in FIG. 15.

Even in an MRAM utilizing a spin valve GMR film in which an antiferromagnetic film 3 is underlaid, by employing an exchange-coupling film of the present invention, excellent performance can be obtained. A structure of an MRAM employing a spin valve GMR film in which an antiferromagnetic film 3 is underlaid is shown in FIG. 15 and FIG. 16. Here, FIG. 15 is a plain view of an MRAM 28, FIG. 16 is a sectional view seen along A-A' line.

In the MRAM 28 shown in FIG. 15 and FIG. 16, on a substrate 19, an antiferromagnetic film 3 is formed. On the antiferromagnetic film 3, a sandwich film of ferromagnetic material layer 23/non-magnetic material layer 22/ferromagnetic material layer 21 is formed. With these, a spin valve GMR film 29 in which the antiferromagnetic 3 is underlaid is constituted. In this case, a lower side ferromagnetic material layer 23 and the antiferromagnetic film 3 constitute an exchange-coupling film, wherein the lower side ferromagnetic material layer 23 is a magnetization pinning layer, the upper side ferromagnetic material layer 21 is a magnetization free layer. In this structure, data is written into the magnetization free layer.

Outside both edge portions of a spin valve GMR film 29 in which the antiferromagnetic film 3 is underlaid, a pair of read electrodes (bit line) 27 are disposed. On the spin valve GMR film 29, an X-direction write electrode 25a is disposed through an insulation layer 24a. Further above them, through an insulation layer 24b, a Y-direction write electrode 25b is disposed. The X-direction write electrode 25a and the Y-direction write electrode 25b are disposed to intersect each other, on the intersected portion thereof the spin valve GMR film 29 is disposed.

Then, an embodiment in which the MR element (GMR element and AMR element)of the above described embodiment is applied in a reproducing MR head and a magnetic recording/reproducing combination head using thereof will be described with reference to FIG. 17 through FIG. 22.

Figure 17:
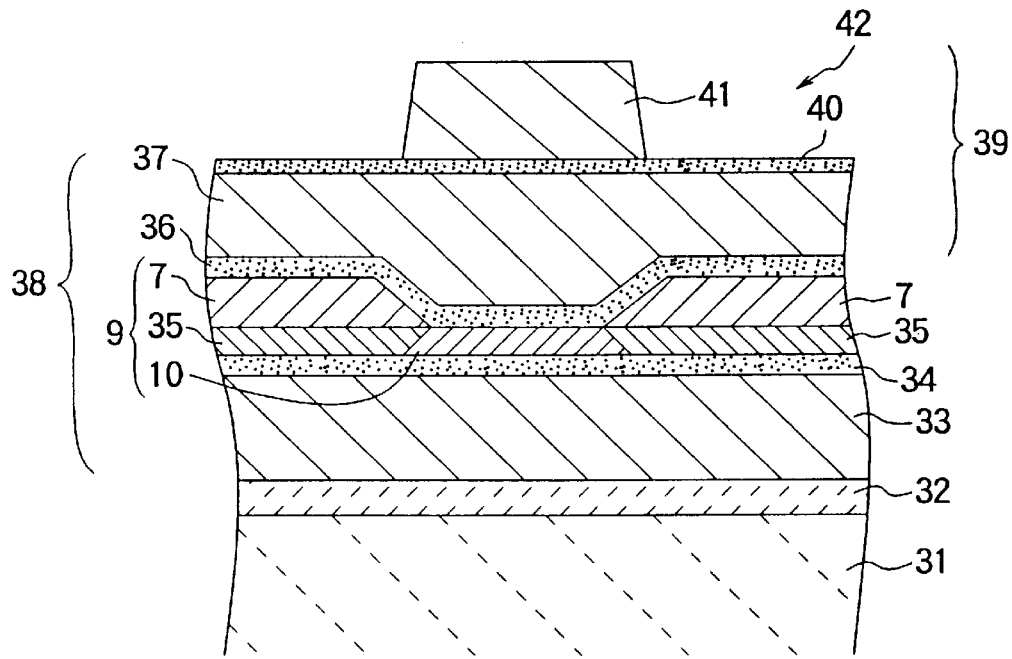
FIG. 17 is a sectional view showing a constitution of a first embodiment of a magnetic recording/reproducing combination head in which a GMR element of the present invention is used.

First of all, an embodiment of a magnetic recording/ reproducing combination head in which an GMR element of the present invention is applied in a reproducing magnetic head will be described. As shown in FIG. 17, on one main surface of a substrate 31 consisting of $Al_2O_3$/TiC and the like, through $Al_2O_3$ insulation layer 32, a lower magnetic shield 33 consisting of soft magnetic material is formed. On the lower magnetic shield 32, through a lower reproducing magnetic gap 34 consisting of a non-magnetic insulation film such as $Al_2O_3$, the GMR element 9 shown in FIG. 12 or FIG. 13 is formed.

Figure 18:
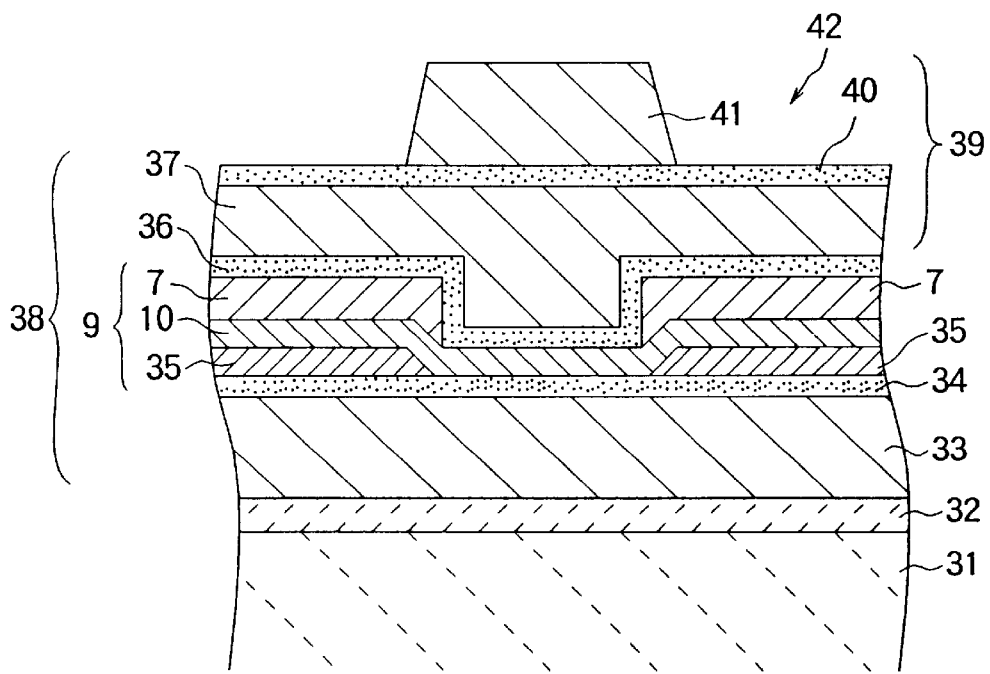
FIG. 18 is a sectional view showing a constitution of a second embodiment of a magnetic recording/reproducing combination head in which a GMR element of the present invention is used.

In the figure, numeral 35 is a hard magnetic film consisting of such as CoPt alloy which supplies a bias magnetic field to a spin valve GMR film 10. In addition, a pair of electrodes 7 are formed on the hard magnetic film 35, the spin valve GMR film 10 and a pair of electrodes 7 being electrically connected through the hard magnetic film 35. The hard magnetic film 35 which supplies a bias magnetic field to the spin valve GMR film 10, as shown in FIG. 18, can be formed in advance on a lower reproducing magnetic gap 34. In this case, on a lower reproducing magnetic gap 34 including on a pair of hard magnetic film 35, a spin valve GMR film 10 is formed, and thereon a pair of electrodes are formed.

On the GMR element 9, an upper reproducing magnetic gap 36 consisting of a non-magnetic insulation film such as $Al_2O_3$ is formed. Further thereon, an upper magnetic shield 37 consisting of a soft magnetic material is formed, with these a shield type GMR head 38 serving as a reproducing head is constituted.

On a reproducing head consisting of a shield type GMR head 38, a recording head consisting of an induction type thin film magnetic head 39 is formed. The upper magnetic shield 37 of the shield type GMR head 38 concurrently serves as a lower portion recording magnetic pole of the induction type thin film magnetic head 39. On the upper magnetic shield 37 which concurrently serves as the lower portion recording magnetic pole, through a recording magnetic gap 40 consisting of a non-magnetic insulation film such as $Al_2O_3$, an upper portion recording magnetic pole 41 patterned in a predetermined shape is formed.

Figure 19:
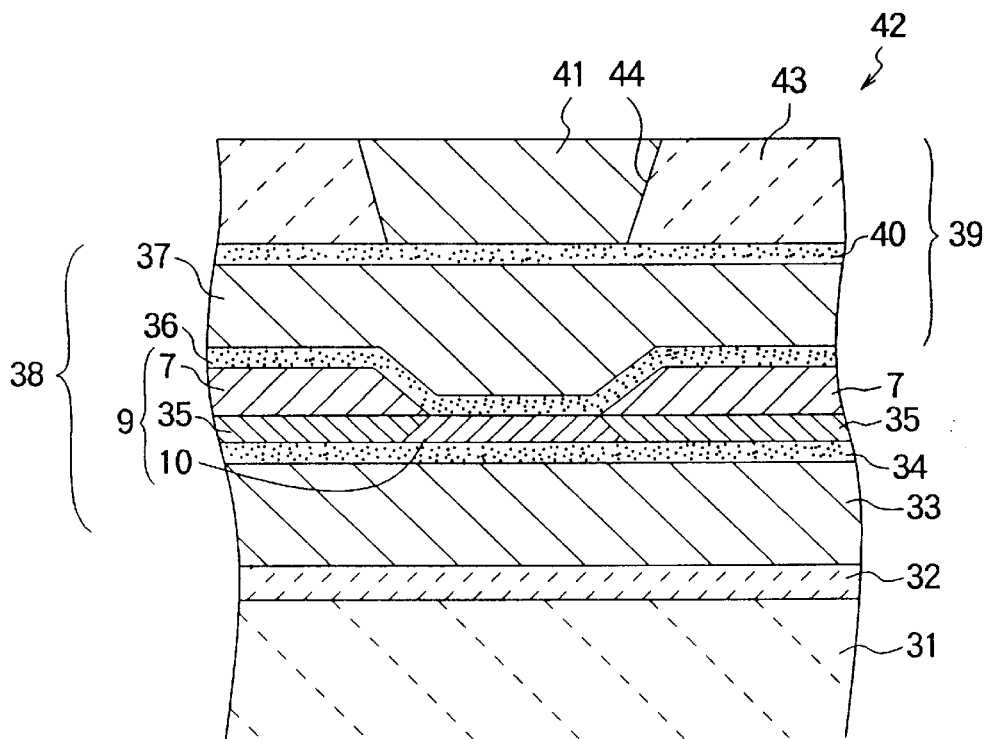
FIG. 19 is a sectional view showing a constitution of a modification example of the magnetic recording/reproducing combination head shown in FIG. 17.
Figure 20:
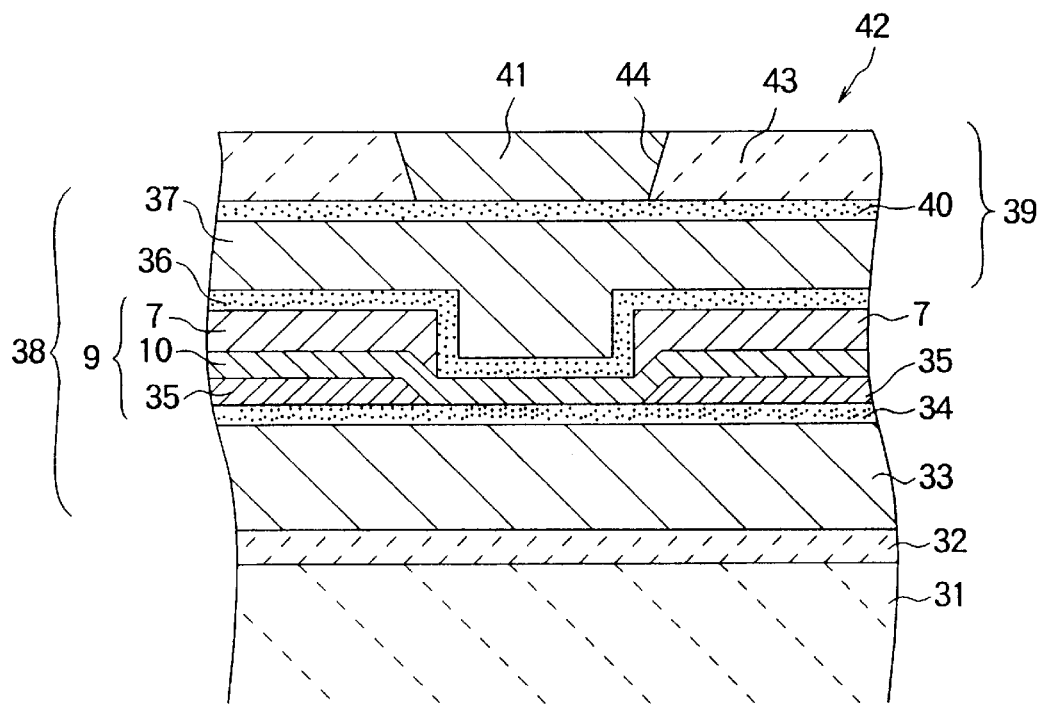
FIG. 20 is a sectional view showing a constitution of a modification example of the magnetic recording/reproducing combination head shown in FIG. 18.

With a reproducing head consisting of such a shield type GMR head 38 and a recording head consisting of an induction type thin film magnetic head 39, a magnetic recording/ reproducing combination head 42 is constituted. ere, an upper portion recording magnetic pole 41, as shown in FIG. 19 and FIG. 20, by disposing a trench 44 in a $SiO_2$ insulation layer 43 formed on a recording magnetic gap 40, can be formed embedding inside the trench 44. According to such an upper portion recording magnetic head 41, a narrow track can be realized with reproducibility. A magnetic recording/ reproducing combination head 42 can be produced by implementing shape formation or separation process by utilizing, for example, a semiconductor process.

In a shield type GMR head 38 in a magnetic recording/ reproducing combination head 42 of the above described embodiment, a large exchange-coupling force and high blocking temperature, which are intrinsically possessed by an exchange-coupling film formed between an antiferromagnetic film consisting of an RMn based alloy and the like and a ferromagnetic film, can be fully exhibited. On a spin valve GMR film 10, though thick film such as an upper magnetic shield and a lower portion recording magnetic pole 37 and a protective film (not shown in the figure) are formed, strain within a film of an antiferromagnetic film of a spin valve GMR film 10 can be alleviated as described above. Therefore, increase of internal stress of an antiferromagnetic film due to thick film formation can be suppressed, thus, excellent magnetic performance can be exhibited. With these, excellent head performance can be made possible to obtain with stability.

Next, an embodiment of a magnetic recording/ reproducing combination head in which an AMR element of the present invention is applied in a reproducing magnetic head will be described with reference to fig. 21 and FIG. 22.

Figure 21:
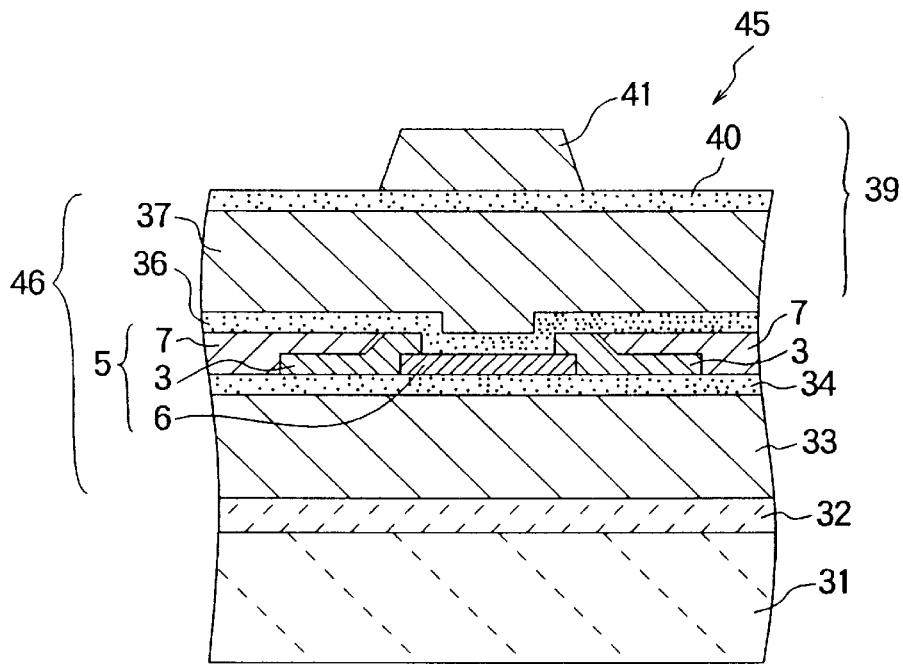
FIG. 21 is a sectional view showing a constitution of a first embodiment of a magnetic recording/reproducing combination head in which an AMR element of the present invention is used.

In a magnetic recording/reproducing combination head 45 shown in FIG. 21, as identical as the previous embodiment, on one main surface of a substrate 31 consisting of $Al_2O_3$/ TiC and the like through an $Al_2O_3$ insulation layer 32, a lower magnetic shield 33 consisting of a soft magnetic material is formed. On the lower magnetic shield 33, through a lower reproducing magnetic gap 34 consisting of a non-magnetic insulation layer such as $Al_2O_3$, the AMR element 5, shown in FIG. 10 is formed. Or, as shown in FIG. 22, on the lower reproducing magnetic gap 34, an AMR element 5, shown FIG. 11 is formed.

On the AMR element 5, as described above, an upper reproducing magnetic gap 36 consisting of a non-magnetic insulation film such as $Al_2O_3$ is formed, further thereon, an upper side shield layer 37 consisting of a soft magnetic material is formed. With these, a shield type AMR head 46 which functions as a reproducing head is constituted. An induction type thin film magnetic head 39 formed on the shield type AMR head 46 has an identical constitution as the above described embodiment. With a reproducing head consisting of the shield type AMR head 46 and a recording head consisting of the induction type thin film magnetic head 39, a magnetic recording/reproducing combination head 45 is constituted.

Also in the magnetic recording/reproducing combination head 46 of this embodiment, a large exchange-coupling force and high blocking temperature, which an exchange-coupling film between an antiferromagnetic film consisting of an RMn based alloy and the like and a ferromagnetic film possesses intrinsically, can be fully exhibited. Therefore, occurrence of Barkhausen noise can be suppressed with stability, and, further, output of the AMR film 6 can be made to be obtained with stability for long term. On the antiferromagnetic film 3, though thick layers such as an upper magnetic shield and an lower portion recording magnetic pole 37 or a protective film (not shown in the figure) are formed, since strain within the film of the antiferromagnetic film 3 is alleviated as described above, increase of the internal stress of the antiferromagnetic film 3 due to thick film formation can be suppressed, thus, excellent magnetic performance can be exhibited. With these, excellent head performance can be made possible to obtain with stability.

Figure 23:
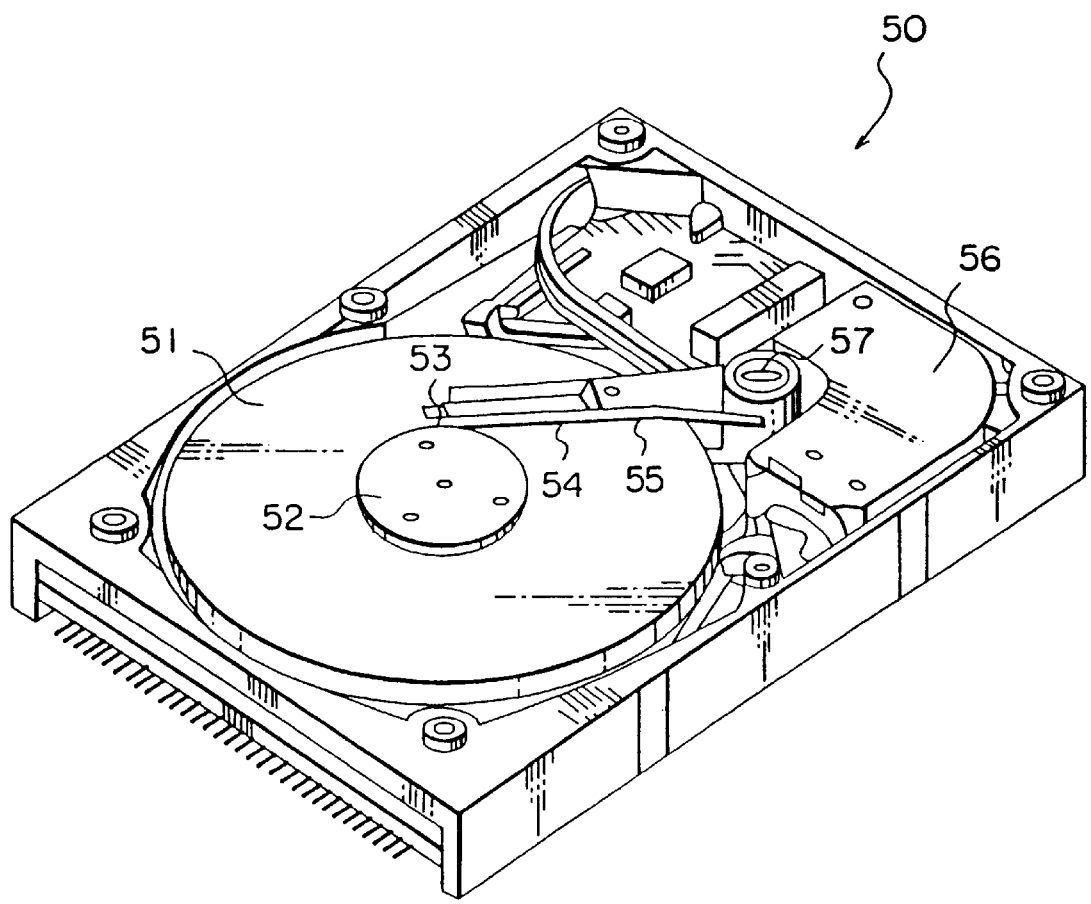
FIG. 23 is a perspective view showing one constitution example of a magnetic disc device in which the magnetic head of the present invention is used.

A magnetic recording/reproducing combination head such as described above is assembled in a head slider. A head slider possessing a magnetic recording/reproducing combination head can be mounted in a magnetic recording device such as a magnetic disc unit shown in FIG. 23. FIG. 23 shows an outline structure of a magnetic disc unit 50 in which a rotary actuator is employed.

A magnetic disc 51 is assembled to a spindle 52 and is rotated by a motor (not shown in the figure)responding to a control signal from a drive unit controller(not shown in the figure). A head slider 53 which records and reproduces information while levitating above the magnetic disc 51 is attached to a tip portion of a thin film shaped suspension 54.

When the magnetic disc 51 rotates, an air bearing surface (ABS) of the head slider 53 is held with a predetermined levitation amount (from 0 to 100 nm or less) from a surface of the magnetic disc 51. The head slider 53 has a magnetic recording/reproducing combination head of the above described embodiment.

The suspension 54 is connected to one end of an actuator arm 55 having a bobbin portion and the like which holds a not shown drive coil. To the other end of the actuator arm 55, a voice coil motor 56, a kind of a linear motor, is disposed. The voice coil motor 56 is constituted of a not shown drive coil which is wound up to a bobbin portion of the actuator arm 55, and a magnetic circuit consisting of a permanent magnet and an opposing yoke which are disposed opposingly so as to sandwich the drive coil.

The actuator arm 55 is held by not shown ball bearings disposed at 2 places above and below a fixed axis 57, and is made possible to rotate and slide freely by the voice coil motor 56.

Then, specific embodiments of the present invention and their evaluated result will be described.

Embodiment 1

At first, employing an RF magnetron sputtering device, on a thermally oxidized Si substrate 1, an antiferromagnetic film 3 of a film thickness of 20 nm consisting of a RhMn alloy and a ferromagnetic film 4 of a film thickness of 5 nm consisting of a CoFe alloy are stacked sequentially in film in a magnetic field. Thus, an exchange-coupling film 2 shown in FIG. 1 is produced. In this time, particular substrate heat treatment is not executed. Further, for film formation of the antiferromagnetic film 3 with the sputtering method, a target consisting of a $Rh_{20}Mn_{80}$ alloy phase in which oxygen content is 0.3% by weight and its density is 95% is used.

Composition of an obtained antiferromagnetic film 3 consisting of the RhMn alloy was identical with that of the target. Further, upon checking a crystal structure with X-ray diffraction, it proved to possess of a face-centered cubic crystal structure. As the result of electron microscope observation and electron beam diffraction of the antiferromagnetic film 3, the average grain diameter of its main grains is about 100 nm. Further, the antiferromagnetic film 3 is in (111) orientation in its film thickness direction, and further the crystalline orientation within its plane is all but lined up with axes parallel. An electron beam diffraction pattern of the antiferromagnetic film 3 is as shown in FIG. 2. Upon checking the exchange-coupling force between such antiferromagnetic film 3 and the ferromagnetic film 4, it proved to have such an excellent value as 500 Oe.

Figure 24:
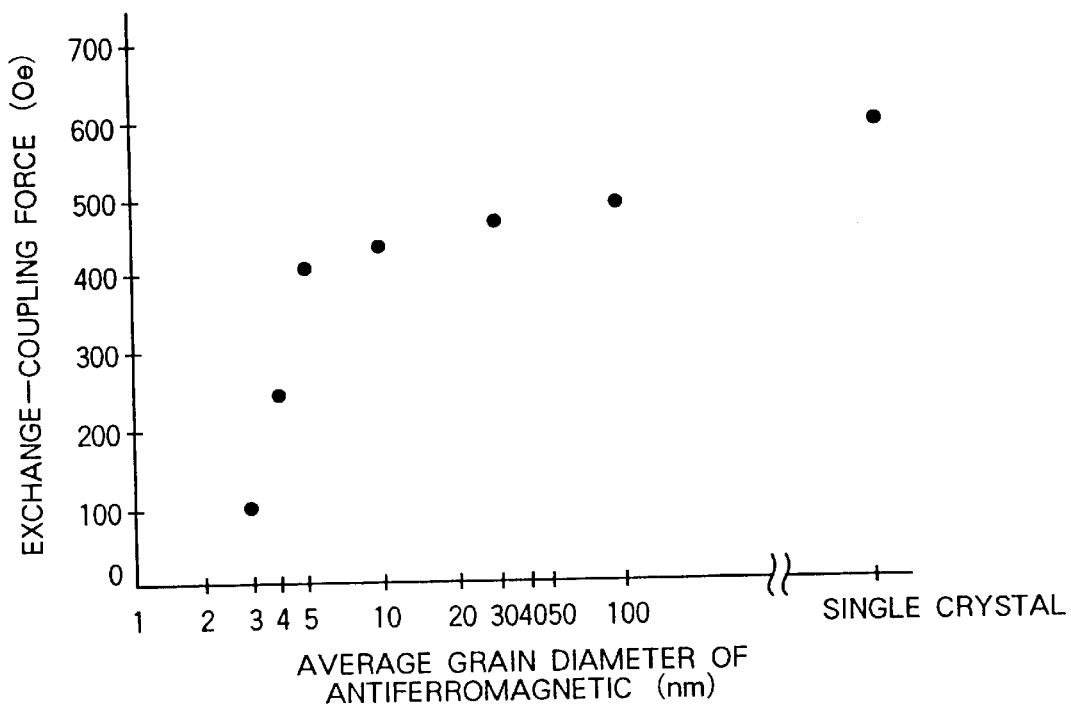
FIG. 24 is a diagram showing a relationship between average grain diameter of the antiferromagnetic film according to the embodiment 1 of the present invention and exchange-coupling force of the exchange-coupling film using thereof.
Figure 26:
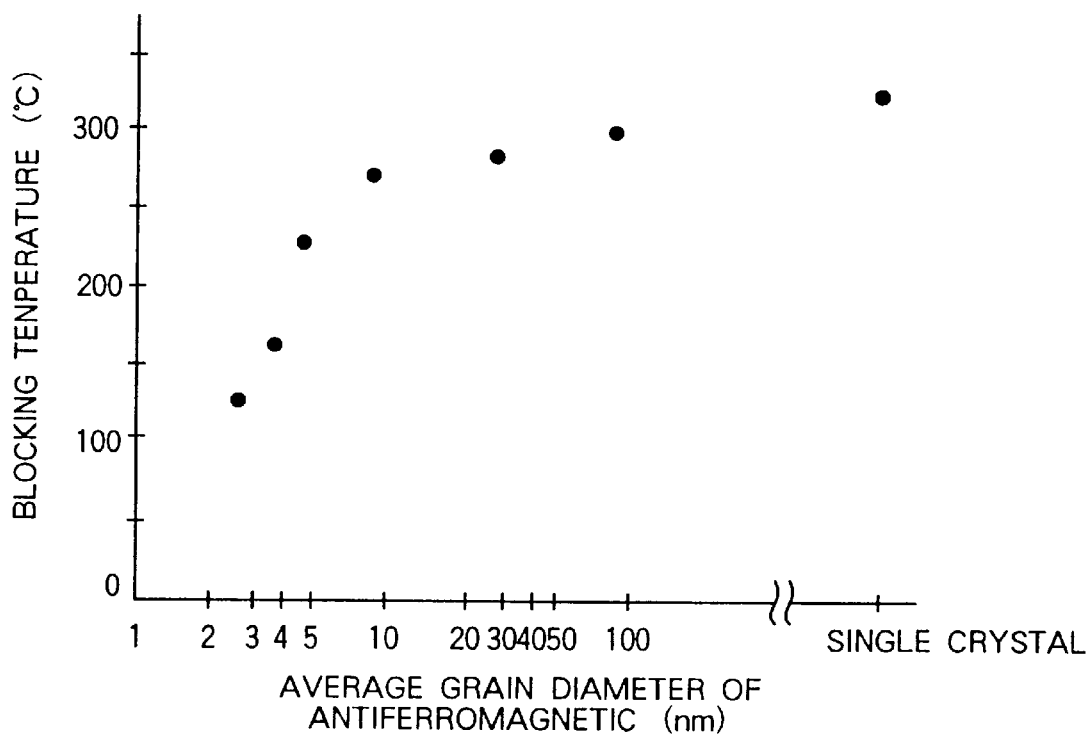
FIG. 26 is a diagram showing a relationship between average grain diameter of the antiferromagnetic film according to the embodiment 1 of the present invention and blocking temperature of the exchange-coupling film using thereof.

Then, antiferromagnetic films 3 consisting of a $Rh_{20}Mn_{80}$ alloy are formed in film with a sputtering method employing a plurality of targets of which oxygen content and density are varied. An average grain diameter of each antiferromagnetic film 3 and exchange-coupling force with the ferromagnetic film 4 consisting of a CoFe alloy are measured. Results are shown in FIG. 24. Further, blocking temperatures of the above described exchange-coupling films are measured. Results are shown in FIG. 26. As obvious from FIG. 24 and FIG. 26, by making the average grain diameter of the antiferromagnetic film 3 5 nm or more, excellent exchange-coupling force and excellent blocking temperature can be obtained with stability.

Embodiment 2

As identical manner as embodiment 1, by forming films of an antiferromagnetic film consisting of an RMn alloy of which composition is shown in Table 1 and a ferromagnetic film consisting of a CoFe alloy, an exchange-coupling film is produced. Targets used for film formation of the antiferromagnetic films with a sputtering method are shown in Table 1. The average grain diameter of main grain and the exchange-coupling force of the antiferromagnetic film in each exchange-coupling film are measured as identical as in embodiment 1. Results are shown in Table 1. All the antiferromagnetic films are confirmed to be orientated in their planes from the electron beam diffraction of their film surfaces and film cross-sections.

| Sample No. | Target Composition (at %) | Oxygen Content (%) | Density (%) | Film Composition (at %) | Average Grain Diameter (nm) | Crystal Structure | Exchange-coupling Force (Oe) |
|---|---|---|---|---|---|---|---|
| 1 | $Ir_{22}Mn_{78}$ | 0.05 | 95 | $Ir_{22}Mn_{78}$ | Single crystal like*1 | fcc | 700 |
| 2 | $Pt_{15}Mn_{85}$ | 0.3 | 93 | $Pt_{15}Mn_{85}$ | 80 | fcc | 450 |
| 3 | $Pt_{48}Mn_{52}$ | 0.2 | 93 | $Pt_{48}Mn_{52}$ | 27 | fct | 500*2 |
| 4 | $Ni_{50}Mn_{50}$ | 0.15 | 95 | $Ni_{50}Mn_{50}$ | 30 | fct | 550*2 |
| 5 | $Cr_{50}Mn_{50}$ | 0.2 | 95 | $Cr_{50}Mn_{50}$ | 35 | bcc | 530 |
| 6 | $Pd_{50}Mn_{50}$ | 0.3 | 96 | $Pd_{50}Mn_{50}$ | 30 | fct | 500*2 |

*1: A film of an almost single crystal like was obtained.
*2: Exchange-coupling force after anneal treatment was shown.

Embodiment 3

With an RF magnetron sputtering device, on a thermally oxidized Si substrate 1, an antiferromagnetic film 3, of which film thickness is 15 nm and is consisting of a PtMnFe alloy, and a ferromagnetic film 4 of a film thickness of 5 nm consisting of a CoFe alloy are sequentially stacked to form film in a magnetic field. Thus, an exchange-coupling film 2 shown in FIG. 1 is produced. In this time, particular substrate heat treatment is not executed. Further, for film formation of the antiferromagnetic film 3 by sputtering, a target consisting of a $Pt_{18}Mn_{72}Fe_{10}$ alloy phase in which oxygen content is 0.3% by weight and density is 95% is used.

Composition of an obtained antiferromagnetic film 3 consisting of the PtMnFe alloy was identical with that of the target. Further, upon checking a crystal structure with X-ray diffraction, it proved to have a face-centered cubic crystal structure. Further, as the result of electron microscope observation and electron beam diffraction of the antiferromagnetic film 3, the average grain diameter was about 85 nm and the antiferromagnetic film 3 was in (111) orientation in its film thickness direction, further crystalline orientation in its plane is all but lined up with axes parallel. Upon checking the exchange-coupling force between such antiferromagnetic film 3 and the ferromagnetic film 4, such an excellent value as 400 Oe is obtained.

Figure 25:
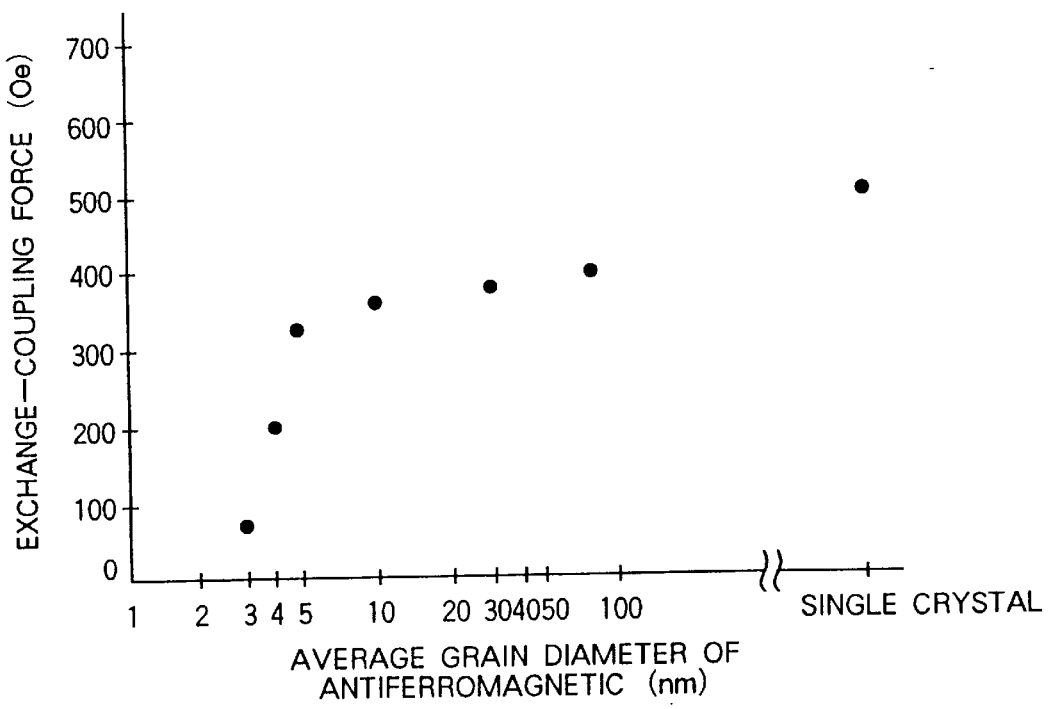
FIG. 25 is a diagram showing a relationship between average grain diameter of the antiferromagnetic film according to the embodiment 3 of the present invention and exchange-coupling force of the exchange-coupling film using thereof.
Figure 27:
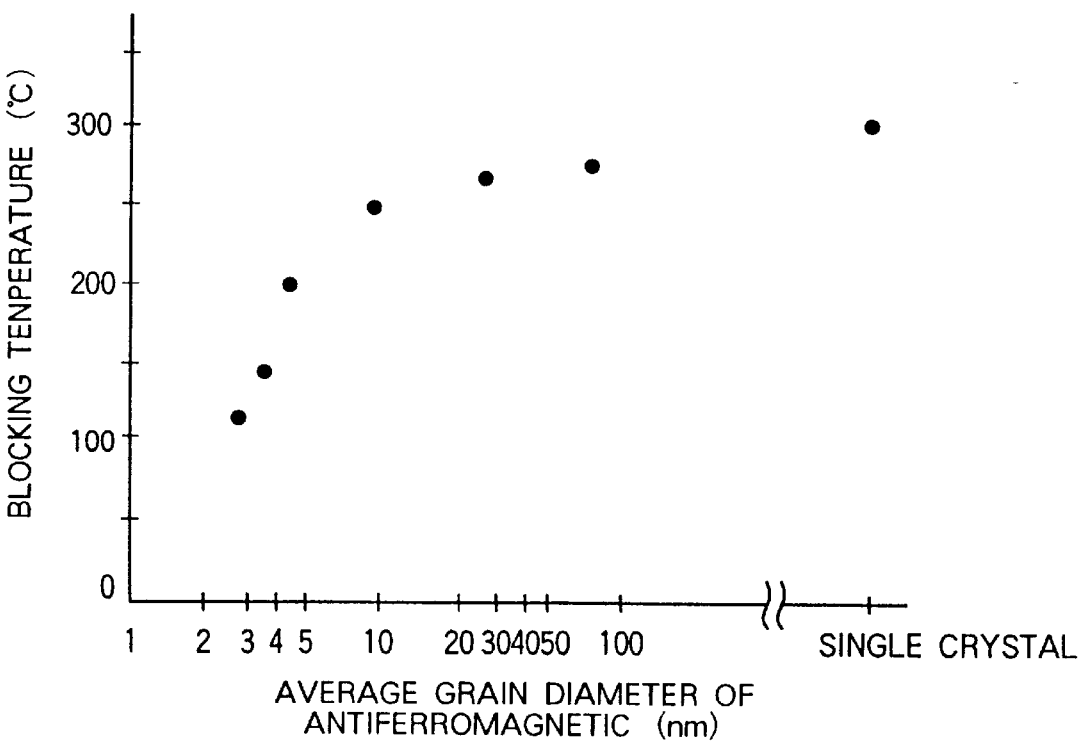
FIG. 27 is a diagram showing a relationship between average grain diameter of the antiferromagnetic film according to the embodiment 3 of the present invention and blocking temperature of the exchange-coupling film using thereof.

Then, antiferromagnetic films 3 consisting of a $Pt_{16}Mn_{72}Fe_{10}$ alloy are formed in film with a sputtering method while employing a plurality of targets of which oxygen content and density are varied. An average grain diameter of each antiferromagnetic film 3 and exchange-coupling force with the ferromagnetic film 4 consisting of a CoFe alloy are measured. Results are shown in FIG. 25. Further, blocking temperatures of the above described exchange-coupling film are measured. Results are shown in FIG. 27. As obvious from FIG. 25 and FIG. 27, even in the antiferromagnetic film consisting of an RMnFe alloy, by making the average grain diameter 5 nm or more, excellent exchange-coupling force and excellent blocking temperature can be obtained with stability.

Further, even when other element than Pt is used as the R element, similar results were obtained.

Embodiment 4

With an exchange-coupling film of the present invention, a magnetic recording/reproducing combination head 42 having a GMR head 38 shown in FIG. 17 through FIG. 20 is manufactured. The structure is identical as that described above. The composition of each antiferromagnetic film is shown in Table 2. In addition, the antiferromagnetic film was made into a film according to the method of embodiment 1. Sendust is used for the lower magnetic shield and permalloy is used for the upper magnetic shield.

Constitution of a spin valve GMR film was (a) structure of Ta(5 nm) /$Co_{81}Zr_3Nb_{16}$(5 nm)/NiFe(2 nm) /$Co_{90}Fe_{10}$ (3 nm)/Cu(3 nm)/$Co_{90}Fe_{10}$(2 nm)/RMn(xnm)/Ta(5 nm), (b) structure of RMn(xnm)/$Co_{90}$ $Fe_{10}$(3 nm)/Cu(3 nm)/ $Co_{90}Fe_{10}$(3 nm)/NiFe(2 nm)/$Co_{81}Zr_3Nb_{16}$(5 nm)/Ta(5 nm). For processing of a head, semiconductor process was employed to separate and form shape.

After wafer process of stacking a reproducing portion and a recording portion, by evaluating R-H characteristic with a prober, the exchange-coupling force between a antiferromagnetic film and a ferromagnetic film within a spin valve GMR film is obtained. The result are shown in Table 2. Here, in the comparative examples in the table, antiferromagnetic film which was not in-plane orientation state and of which average grain diameters was 5 nm or less was used.

TABLE 2

| GMR structure | RMn alloy composition | Film thickness (nm) | Exchange-coupling force (Oe) | Exchange-coupling force of head of comparative example |
|---|---|---|---|---|
| (a) | $Ir_{22}Mn_{78}$ | 5.5 | 750 | 350 |
|  | $Pt_{13}Mn_{87}$ | 15 | 410 | 200 |
|  | $Pt_{47}Mn_{53}$ | 30 | 500 | 220 |
|  | $Ni_{53}Mn_{47}$ | 40 | 700 | 320 |
|  | $Rh_{18}Mn_{82}$ | 10 | 700 | 290 |
|  | $Cr_{50}Mn_{50}$—Pt | 30 | 500 | 250 |
|  | $Pd_{50}Mn_{50}$ | 30 | 650 | 300 |
| (b) | $Ir_{22}Mn_{78}$ | 15 | 900 | 400 |
|  | $Pt_{13}Mn_{87}$ | 20 | 500 | 230 |
|  | $Pt_{47}Mn_{53}$ | 40 | 520 | 220 |
|  | $Ni_{53}Mn_{47}$ | 45 | 780 | 370 |
|  | $Rh_{18}Mn_{82}$ | 20 | 790 | 350 |
|  | $Cr_{50}Mn_{50}$—Pt | 40 | 600 | 290 |
|  | $Pd_{50}Mn_{50}$ | 40 | 700 | 320 |

As seen from Table 2, deterioration of the exchange-coupling force at the time when the wafer process completed is not found in the exchange-coupling films of the present invention. Here, even when various soft magnetic film of a crystalline type such as permalloy, sendust or an amorphous type such as CoZrNb is used for each shield layer, identical results were obtained.

Further, in this embodiment, though CoZrNb/NiFe/CoFe is used for a constitution of a magnetization free layer, as in the case of NiFe(10 nm)/CoFe(1 nm) or NiFe(10 nm)/Co(1 nm), even when together with omission of CoZrNb, NiFe is made thick and CoFe or Co layer is made thin, identical effect was obtained.

Embodiment 5

Figure 22:
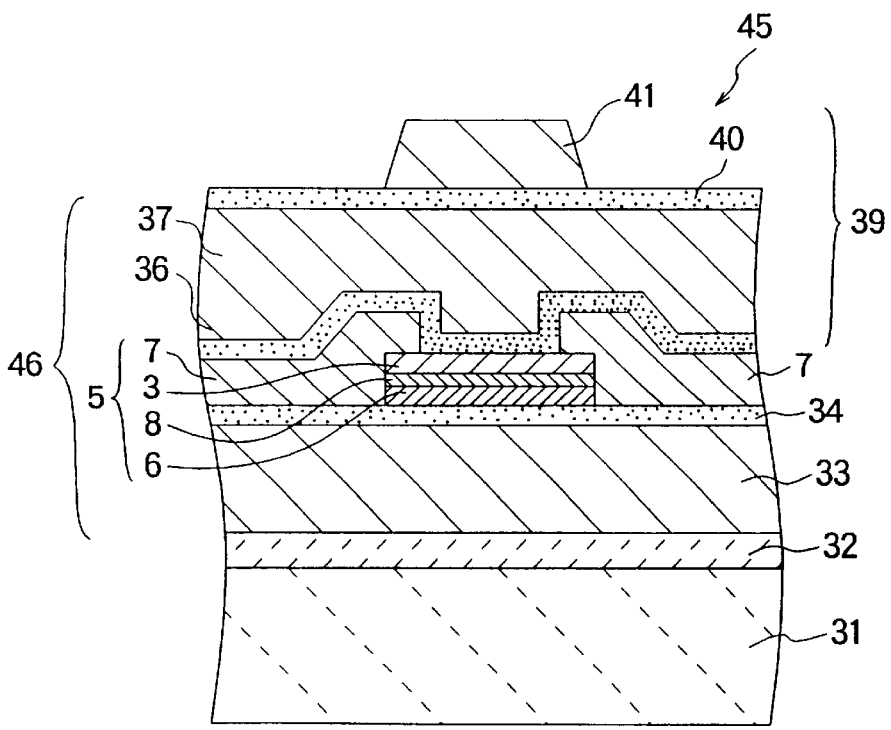
FIG. 22 is a sectional view showing a constitution of a second embodiment of a magnetic recording/reproducing combination head in which an AMR element of the present invention is used.

With an exchange-coupling film of the present invention, a magnetic recording/reproducing combination head 45 having an AMR head 46 shown in FIG. 21 and FIG. 22, respectively, is manufactured. Their structure was identical with that described above. The composition of antiferromagnetic films were $R_{20}Mn_{80}$ and $R_{50}Mn_{50}$, film formation thereof was executed according to embodiment 1. For an AMR film 6, a lower magnetic shield and an upper magnetic shield, a $Ni_{20}Fe_{80}$ alloy film, sendust and permalloy were employed, respectively.

After wafer process where a reproducing portion and a recording portion were stacked was over, the R-H characteristics was evaluated with a prober to obtain the exchange-coupling force between an antiferromagnetic film and a ferromagnetic film in the AMR film. As the result, as identical as embodiment 4, the magnetic head using the antiferromagnetic film of the present invention showed reflection of characteristics of that obtained when only the exchange-coupling film was manufactured. Besides, the magnetic head which was produced as the comparative example and used an antiferromagnetic film, of which average grain diameter was 5 nm or less and of which crystalline orientation was not lined up with axes parallel, showed the exchange-coupling force as large as about one half.

As described above, according to the present invention, performance possessed intrinsically by an antiferromagnetic film consisting of a Mn alloy which is excellent in its corrosion resistance or heat resistance can be obtained with stability. Therefore, an exchange-coupling film excellent in its exchange-coupling force or thermal stability thereof, corrosion resistance and the like can be provided with reproducibility. According to a magneto-resistance effect element of the present invention in which such an exchange-coupling film is employed, excellent performance can be obtained with stability. According to a magnetic head of the present invention, stable output characteristics can be obtained for a long term.

What is claimed is:

1. An exchange-coupling film, comprising:
 a ferromagnetic film; and
 an antiferromagnetic film containing R—Mn (R is at least one kind of element selected from Ir, Rh, Pt, Au, Ag, Co, Pd, Ni, Cr, Ge, Ru, Re and Cu) and exchange-coupled with the ferromagnetic film,
 said antiferromagnetic film having crystallographic directions oriented in its plane so that distribution of each diffraction point of electron beam diffraction pattern of the antiferromagnetic film is within ±15°.

2. The exchange-coupling film as set forth in claim 1:
 wherein, the ferromagnetic film is at least in part stacked with the antiferromagnetic film.

3. The exchange-coupling film as set forth in claim 1, wherein the distribution is within ±15° when incident electron beam is applied with respect to top surface or side surface of the antiferromagnetic film.

4. The exchange-coupling film as set forth in claim 1:
 wherein, in the antiferromagnetic film, one main grain is constituted of a plurality of sub-grains and crystalline directions in its plane of the sub-grain are line up with axes parallel.

5. The exchange-coupling film as set forth in claim 1:
 wherein, the antiferromagnetic film has an average grain diameter of 5 nm or more.

6. The exchange-coupling film as set forth in claim 1:
 wherein, at least a part of the antiferromagnetic film has a crystal structure of face-centered cubic crystal structure, face-centered tetragonal crystal structure, body-centered cubic crystal structure or body-centered tetragonal crystal structure.

7. The exchange-coupling film as set forth in claim 1:
 wherein, the antiferromagnetic film comprises an antiferromagnetic alloy substantially expressed by a general formula:

$$R_xMn_{100-x}$$

(in the formula, x designates a number satisfying $2 \leq x \leq 80$ at %) or
 a general formula:

$$(R_{x'}Mn_{1-x'})_{100-y}Fe_y$$

(in the formula, x' and y designate numbers satisfying $0.02 \leq x' \leq 0.80$ and $0 < y < 30$ at %, respectively).

8. The exchange-coupling film as set forth in claim 7:
 wherein, the antiferromagnetic film further contains at least one kind of element selected from Ta, Hf, Ti, Nb, Si, Al, W, Zr, Ga, Be, In, Sn, V, Mo, Ru, Os, Cd, Zn and N in the range of 50 at % or less.

9. The exchange-coupling film as set forth in claim 1:
 wherein, the antiferromagnetic film has composition substantially expressed by a general formula:

$$R_xMn_{100-x}$$

(in the formula, x designates a number satisfying $2 \leq x \leq 50$ at %),
 and at least a part thereof has a crystal structure of face-centered cubic.

10. The exchange-coupling film as set forth in claim 1:
 wherein, the antiferromagnetic film has composition substantially expressed by a general formula:

$$R_xMn_{100-x}$$

(in the formula, x designates a number satisfying $30 \leq x \leq 70$ at %)
 and at least a part thereof has a crystal structure of face-centered tetragonal or body-centered cubic.

11. The exchange-coupling film as set forth in claim 1:
 wherein, the ferromagnetic film has a Co or a Co alloy layer having a crystal structure of face-centered cubic or hexagonal close-packing.

12. The exchange-coupling film as set forth in claim 1:
 wherein, the antiferromagnetic film is formed by using an alloy target of which oxygen content is 1% by weight or less.

13. A magneto-resistance effect element, comprising:
 an exchange-coupling film as set forth in claim 1; and
 an electrode for providing an electric current to a ferromagnetic film of the exchange-coupling film.

14. The magneto-resistance effect element as set forth in claim 13:
 wherein the ferromagnetic film has a first ferromagnetic material layer pinned in its magnetization by the antiferromagnetic film,
 further comprising a second ferromagnetic material layer stacked with the first ferromagnetic material layer through a non-magnetic material layer.

15. The magneto-resistance effect element as set forth in claim 14:
 wherein, the ferromagnetic material layer pinned in its magnetization by the antiferromagnetic film is stacked with the antiferromagnetic film.

16. The magneto-resistance effect element as set forth in claim 13, wherein the distribution is within ±15° when incident electron beam is applied with respect to top surface or side surface of the antiferromagnetic film.

17. The magneto-resistance effect element as set forth in claim 13:

wherein, the antiferromagnetic film in the exchange-coupling film has an average grain diameter of 5 nm or more.

18. The magneto-resistance effect element as set forth in claim 13:

wherein, the antiferromagnetic film has composition substantially expressed by a general formula:

$$R_xMn_{100-x}$$

(in the formula, x designates a number satisfying $2 \leq x \leq 50$ at %), and at least a part thereof has a crystal structure of face-centered cubic.

19. A magnetic head, comprising:

a lower magnetic shield;

a magneto-resistance effect element as set forth in claim 13 formed on the lower magnetic shield through a lower reproducing magnetic gap; and an upper magnetic shield formed on the magneto-resistance effect element through an upper reproducing magnetic gap.

20. The magnetic head as set forth in claim 19, further comprising:

a lower magnetic pole and the upper magnetic shield being one body;

a recording magnetic gap formed on the lower magnetic pole; and an upper magnetic pole disposed on the recording magnetic gap.

21. A magnetic recording apparatus, comprising:

a magnetic recording medium; and the magnetic head as set forth in claim 20, the magnetic head recording a signal to the medium through a magnetic field and reproducing a signal through a magnetic field generated from the medium.

* * * * *

UNITED STATES PATENT AND TRADEMARK OFFICE
CERTIFICATE OF CORRECTION

PATENT NO.: 5,976,713

DATED: November 2, 1999

INVENTOR(S): Hiromi Fuke et al.

It is certified that an error appears in the above-identified patent and that said Letters Patent is hereby corrected as shown below:

Claim 4, column 23, line 57, change "line up" to --lined up--.

Claim 7, column 24, lines 7-8, change "$2 \leq x \leq 80$ at %)" to --$2 \leq x \leq 80 at\%)$--;

Claim 7, column 24, line 14, change "$0<y<30$ at %," to --$0<y<30 at\%$,--.

Claim 8, column 24, line 19, change "50 at %" to --50at%--.

Claim 9, column 24, lines 26-27, change "$2 \leq x \leq 50$ at %)" to --$2 \leq x \leq 50 at\%)$--.

Claim 10, column 24, lines 36-37, change "$30 \leq x \leq 70$ at %)" to --$30 \leq x \leq 70 at\%)$--.

Claim 18, column 25, lines 16-17, change "$2 \leq x \leq 50$ at %)" to --$2 \leq x \leq 50 at\%)$--.

Signed and Sealed this

Twenty-fifth Day of July, 2000

Attest:

Q. TODD DICKINSON

*Attesting Officer*  *Director of Patents and Trademarks*